US012608296B2

(12) United States Patent
Peiffer et al.

(10) Patent No.: US 12,608,296 B2
(45) Date of Patent: Apr. 21, 2026

(54) PLATFORM GENERATION SYSTEM AND METHOD

(71) Applicant: COREONYX Government Solutions LLC, Reston, VA (US)

(72) Inventors: Katherine Anne Peiffer, Vienna, VA (US); David Jonathan Polonsky, Orlando, FL (US); Guy E. Mincey, Leesburg, VA (US)

(73) Assignee: COREONYX Government Solutions LLC, Reston, VA (US)

( * ) Notice: Subject to any disclaimer, the term of this patent is extended or adjusted under 35 U.S.C. 154(b) by 105 days.

(21) Appl. No.: 18/811,381

(22) Filed: Aug. 21, 2024

(65) Prior Publication Data
US 2025/0068539 A1 Feb. 27, 2025

Related U.S. Application Data

(60) Provisional application No. 63/578,060, filed on Aug. 22, 2023.

(51) Int. Cl.
*G06F 11/34* (2006.01)
*H04N 21/24* (2011.01)

(52) U.S. Cl.
CPC ...... *G06F 11/3466* (2013.01); *G06F 11/3438* (2013.01); *H04N 21/2407* (2013.01); *G06F 2201/875* (2013.01)

(58) Field of Classification Search
None
See application file for complete search history.

(56) References Cited

U.S. PATENT DOCUMENTS

2014/0337711 A1* 11/2014 Poole ................... G06F 16/958
715/234
2020/0320582 A1* 10/2020 Hollis ...................... G06N 3/04

OTHER PUBLICATIONS

CERTAIN-T™—Coreonyx, Delivering Government Excellence in Digital Transformation, retrieved Aug. 21, 2024, pp. 1-9.
LinkedIn—COREONYX's Post retrieved on Aug. 21, 2024, pp. 1-12. https://www.linkedin.com/posts/coreonyx-incorporated_digitaltransformation-usdsplaybook-certain-activity-7171504878370832385-Tmp-?utm_source=share&utm_medium=member_desktop.
LinkedIn—COREONYX's Post retrieved on Aug. 21, 2024, pp. 1-11. https://www.linkedin.com/posts/coreonyx-incorporated_digitaltransformation-usdsplaybook-govcon-activity-7161443295938736128-gX9W?utm_source=share&utm_medium=member_desktop.
LinkedIn—COREONYX's Post retrieved on Aug. 21, 2024, pp. 1-12. https://www.linkedin.com/posts/coreonyx-incorporated_usdsplaybook-digitaltransformation-govtech-activity-7151218712132419584-_V8i?utm_source=share&utm_medium=member_desktop.
LinkedIn—COREONYX's Post retrieved on Aug. 21, 2024, pp. 1-7. https://www.linkedin.com/posts/coreonyx-incorporated_usds-govtech-certaint-activity-7138550233273094145-xWCk?utm_source=share&utm_medium=member_desktop.

* cited by examiner

*Primary Examiner* — Schquita D Goodwin
*Assistant Examiner* — Ishrat Rashid
(74) *Attorney, Agent, or Firm* — Pillsbury Winthrop Shaw Pittman LLP

(57) ABSTRACT

Platform generation and management techniques that include a discovery process, a strategy process, an execution process, and an iteration process to develop, deploy, and iteratively improve a digital platform, such as a website or other digital content delivery platform.

19 Claims, 20 Drawing Sheets

| Address | Status Code | Title 1 | Indexability Status | Indexability Status | GA Sessions | GA % New Sessions | GA Users | GA New Users | GA Bounce Rate | GA Page Views Per Session | GA Avg Session Duration | GA Page Views | GA Unique Page Views | GA Avg Time on Page |
|---|---|---|---|---|---|---|---|---|---|---|---|---|---|---|
| https://www.website.com/inde | 200 | Company Administr | Indexable | Indexable | 5797751 | 51.24 | 4217221 | 2970919 | 19.27 | 3.51 | 00:06:41 | 11372703 | 8008826 | 00:00:39 |
| https://www.website.com/myac | 200 | Replacement Card | Indexable | | 426200 | 62.44 | 360383 | 266104 | 31.72 | 2.42 | 00:06:01 | 1117836 | 910629 | 00:01:07 |
| http://www.website.com/myac | 302 | | Non-indexa | Redirected | 426200 | 62.44 | 360383 | 266104 | 31.72 | 2.42 | 00:06:01 | 1117836 | 910629 | 00:01:07 |
| https://www.website.com/agen | 200 | Contact Company B | Indexable | | 120378 | 41.75 | 101366 | 50252 | 65.23 | 1.71 | 00:02:01 | 545243 | 470282 | 00:03:15 |
| https://www.website.com/bene | 200 | Benefit Estimator | Indexable | | 96808 | 61.27 | 87413 | 59313 | 17.08 | 2.96 | 00:05:05 | 602722 | 439952 | 00:02:18 |
| https://www.website.com/cust | 200 | Learn what documen | Indexable | | 98809 | 40.20 | 75517 | 39718 | 70.32 | 1.72 | 00:02:40 | 420168 | 369110 | 00:03:22 |

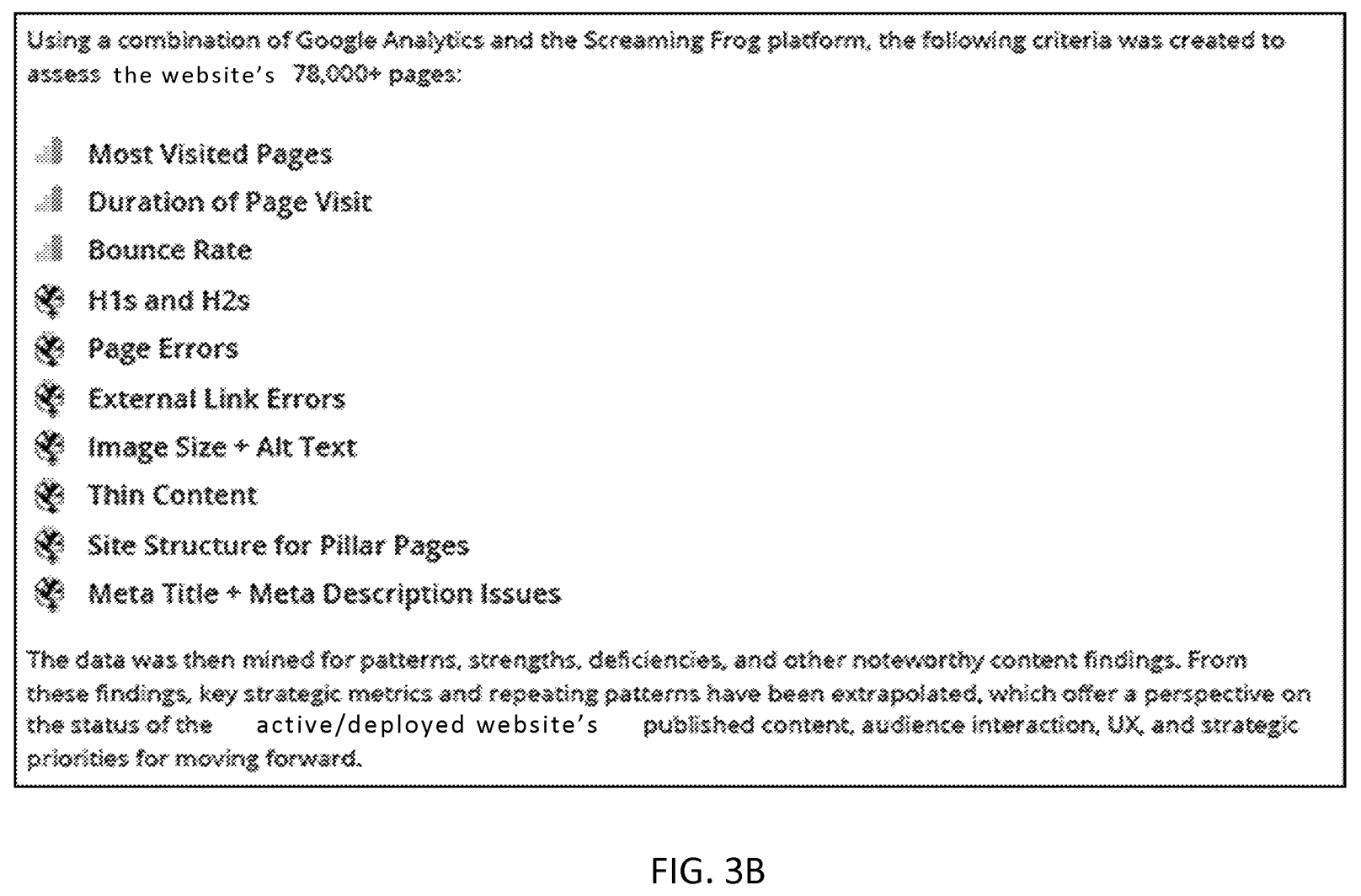

Using a combination of Google Analytics and the Screaming Frog platform, the following criteria was created to assess the website's 78,000+ pages:

◀ Most Visited Pages

◀ Duration of Page Visit

◀ Bounce Rate

☙ H1s and H2s

☙ Page Errors

☙ External Link Errors

☙ Image Size + Alt Text

☙ Thin Content

☙ Site Structure for Pillar Pages

☙ Meta Title + Meta Description Issues

The data was then mined for patterns, strengths, deficiencies, and other noteworthy content findings. From these findings, key strategic metrics and repeating patterns have been extrapolated, which offer a perspective on the status of the    active/deployed website's    published content, audience interaction, UX, and strategic priorities for moving forward.

FIG. 3B

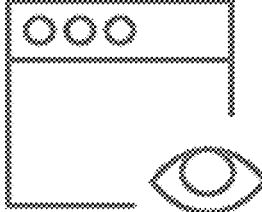

Page Visits & Views

1,922
pages which received visits in February 2021, of 78,000+ total

645,081
average unique page visits to the site's top 20 most visited pages, of 1,922 total
(ranging from 8,008,826 to 144,865)

23
average unique page visits to the site's bottom 20 visited pages, of 1,922 total

1,196
pages which received less than 500 unique views, of 1,922 total
(compared to several hundred thousand visits for the top viewed pages)

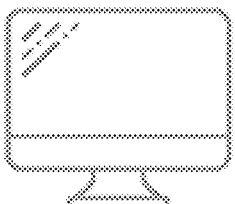

Unique Visits & Time

8,008,826
unique page visits to the homepage
(top visited page)

144,865
unique page visits to the Disability Benefits, How You Qualify page
(top 20th visited page)

00:00:39
2nd shortest time spent on a "top 20" page
(the homepage)

00:05:25
the longest time spent on a "top 20" page
(the baby names page)

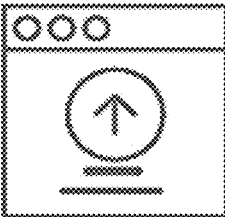

Bounce Rate

19.3%
homepage bounce rate, indicating users exited the site immediately after
viewing the homepage, without navigating to subsequent pages

86.4%
the "baby names" page bounce rate, highest bounce rate from the top
visited 20 pages

**Note: SSA's baby page is Google's top ranked return for search keywords
"top baby names," and 2nd top ranked return for "baby names"

FIG. 3C

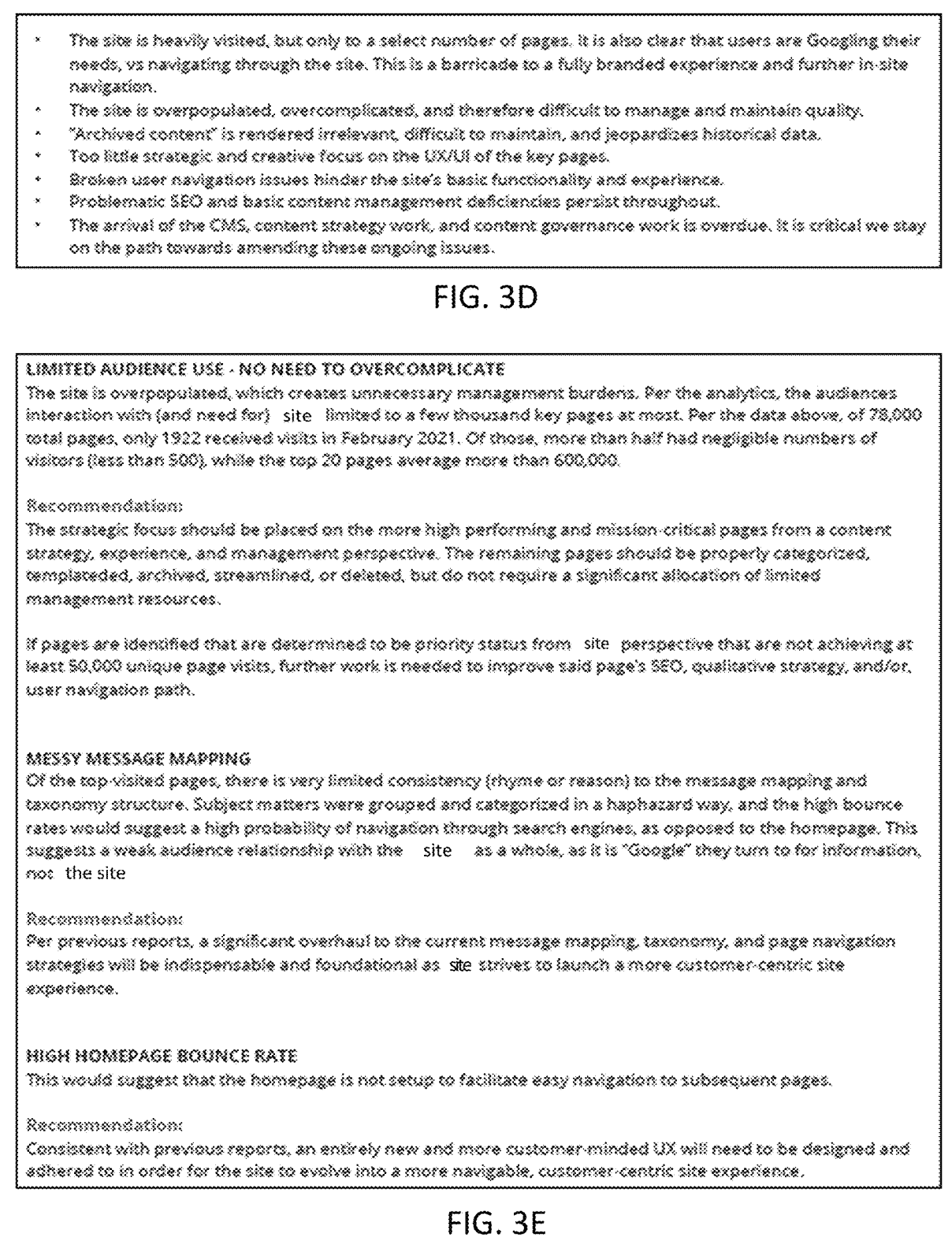

- The site is heavily visited, but only to a select number of pages. It is also clear that users are Googling their needs, vs navigating through the site. This is a barricade to a fully branded experience and further in-site navigation.
- The site is overpopulated, overcomplicated, and therefore difficult to manage and maintain quality.
- "Archived content" is rendered irrelevant, difficult to maintain, and jeopardizes historical data.
- Too little strategic and creative focus on the UX/UI of the key pages.
- Broken user navigation issues hinder the site's basic functionality and experience.
- Problematic SEO and basic content management deficiencies persist throughout.
- The arrival of the CMS, content strategy work, and content governance work is overdue. It is critical we stay on the path towards amending these ongoing issues.

FIG. 3D

LIMITED AUDIENCE USE - NO NEED TO OVERCOMPLICATE

The site is overpopulated, which creates unnecessary management burdens. Per the analytics, the audiences interaction with (and need for) site limited to a few thousand key pages at most. Per the data above, of 78,000 total pages, only 1922 received visits in February 2021. Of those, more than half had negligible numbers of visitors (less than 500), while the top 20 pages average more than 600,000.

Recommendation:
The strategic focus should be placed on the more high performing and mission-critical pages from a content strategy, experience, and management perspective. The remaining pages should be properly categorized, templateded, archived, streamlined, or deleted, but do not require a significant allocation of limited management resources.

If pages are identified that are determined to be priority status from site perspective that are not achieving at least 50,000 unique page visits, further work is needed to improve said page's SEO, qualitative strategy, and/or user navigation path.

MESSY MESSAGE MAPPING

Of the top-visited pages, there is very limited consistency (rhyme or reason) to the message mapping and taxonomy structure. Subject matters were grouped and categorized in a haphazard way, and the high bounce rates would suggest a high probability of navigation through search engines, as opposed to the homepage. This suggests a weak audience relationship with the site as a whole, as it is "Google" they turn to for information, not the site Recommendation:
Per previous reports, a significant overhaul to the current message mapping, taxonomy, and page navigation strategies will be indispensable and foundational as site strives to launch a more customer-centric site experience.

HIGH HOMEPAGE BOUNCE RATE

This would suggest that the homepage is not setup to facilitate easy navigation to subsequent pages.

Recommendation:
Consistent with previous reports, an entirely new and more customer-minded UX will need to be designed and adhered to in order for the site to evolve into a more navigable, customer-centric site experience.

FIG. 3E

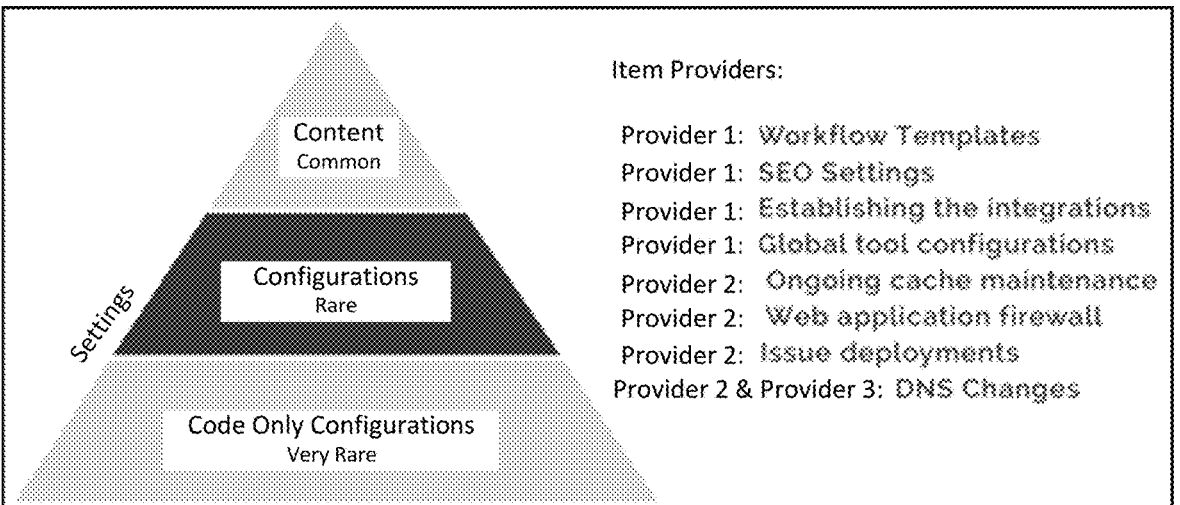

Item Providers:

Provider 1: Workflow Templates
Provider 1: SEO Settings
Provider 1: Establishing the integrations
Provider 1: Global tool configurations
Provider 2: Ongoing cache maintenance
Provider 2: Web application firewall
Provider 2: Issue deployments
Provider 2 & Provider 3: DNS Changes

FIG. 3H

| Customer Experience | Fiscal Performance | System Performance | System Performance |
|---|---|---|---|
| 100% | $285M | 1.2s | 97% |
| Uptime | Savings | Loadtime | Efficiency |
| New architecture | Estimated savings over 5 years | Pages display in 1.2s | 97% of traffic served by CDN |
| Web content management system | Savings in front-line processing | Better customer experience | Lower server hosting costs |
| Content delivery network (CDN) | Savings in infrastructure expense | 98th percentile performance | Improved reliability & faster speed |

FIG. 3I

| Provider/ Feature | Carahsoft Akamai Kona | AWS CloudFront**** | Carahsoft Acquia Edge/ Akamai Kona | Carahsoft Acquia Edge/ CloudFlare |
|---|---|---|---|---|
| Point of Presence (POP)s | 4000+ | 225+ | 4000+ | 165+ |
| Compliance | ● ISO 27001<br>● SOC 2 Type 2<br>● PCI DSS<br>● FedRAMP | ● ISO 27001<br>● SOC 2 Type 2<br>● PCI DSS<br>● FedRAMP | ● ISO 27001<br>● SOC 2 Type 2<br>● PCI DSS<br>● FedRAMP | ● ISO 27001<br>● SOC 2 Type 2<br>● PCI DSS |
| Static Content Delivery* | Yes | Yes | Yes | Yes |
| Advanced Content Purging* | Yes | Yes | Yes | Yes |
| Image Optimization* | Yes | No | Yes | No |
| File Storage* | Yes | Yes | Yes | Yes |
| On-Demand Video* | Yes | Yes | Yes | Yes |
| Real-Time Video* | Yes | Yes | Yes | Yes |
| Integrated DRM* | Yes | Yes | Yes | Yes |
| Geo-Blocking* | Yes | Yes | Yes | Yes |

FIG. 4A

No code, controlled through Provider UI

· Pages
· Pre-Defined Content
· Taxonomy
· Navigation
· Media

Content
Common

Configurations
Rare

Code Only Configurations
Very Rare

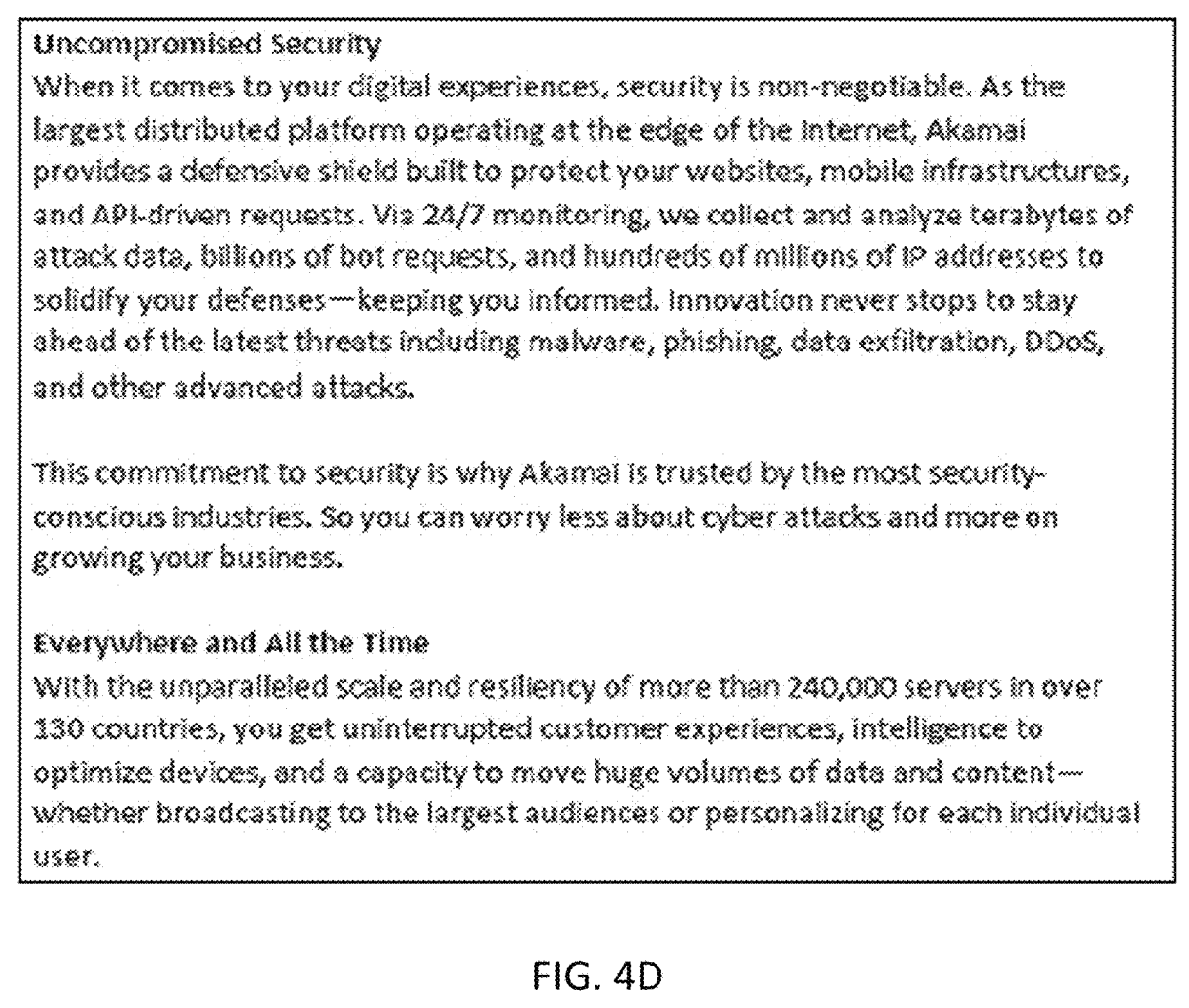

Uncompromised Security

When it comes to your digital experiences, security is non-negotiable. As the largest distributed platform operating at the edge of the Internet, Akamai provides a defensive shield built to protect your websites, mobile infrastructures, and API-driven requests. Via 24/7 monitoring, we collect and analyze terabytes of attack data, billions of bot requests, and hundreds of millions of IP addresses to solidify your defenses—keeping you informed. Innovation never stops to stay ahead of the latest threats including malware, phishing, data exfiltration, DDoS, and other advanced attacks.

This commitment to security is why Akamai is trusted by the most security-conscious industries. So you can worry less about cyber attacks and more on growing your business.

Everywhere and All the Time

With the unparalleled scale and resiliency of more than 240,000 servers in over 130 countries, you get uninterrupted customer experiences, intelligence to optimize devices, and a capacity to move huge volumes of data and content— whether broadcasting to the largest audiences or personalizing for each individual user.

FIG. 4D

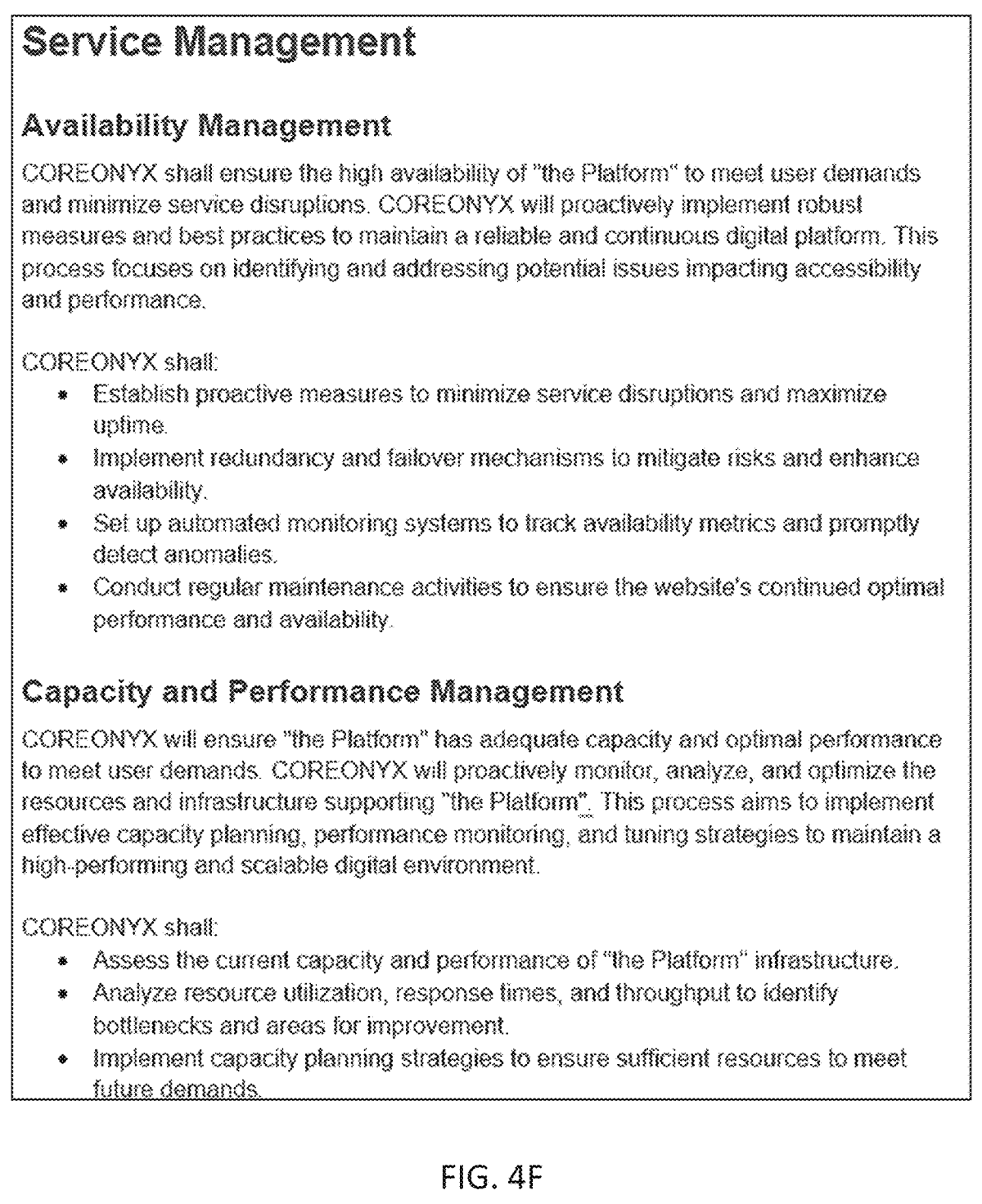

Service Management

Availability Management

COREONYX shall ensure the high availability of "the Platform" to meet user demands and minimize service disruptions. COREONYX will proactively implement robust measures and best practices to maintain a reliable and continuous digital platform. This process focuses on identifying and addressing potential issues impacting accessibility and performance.

COREONYX shall:
- Establish proactive measures to minimize service disruptions and maximize uptime.
- Implement redundancy and failover mechanisms to mitigate risks and enhance availability.
- Set up automated monitoring systems to track availability metrics and promptly detect anomalies.
- Conduct regular maintenance activities to ensure the website's continued optimal performance and availability.

Capacity and Performance Management

COREONYX will ensure "the Platform" has adequate capacity and optimal performance to meet user demands. COREONYX will proactively monitor, analyze, and optimize the resources and infrastructure supporting "the Platform". This process aims to implement effective capacity planning, performance monitoring, and tuning strategies to maintain a high-performing and scalable digital environment.

COREONYX shall:
- Assess the current capacity and performance of "the Platform" infrastructure.
- Analyze resource utilization, response times, and throughput to identify bottlenecks and areas for improvement.
- Implement capacity planning strategies to ensure sufficient resources to meet future demands.

FIG. 4F

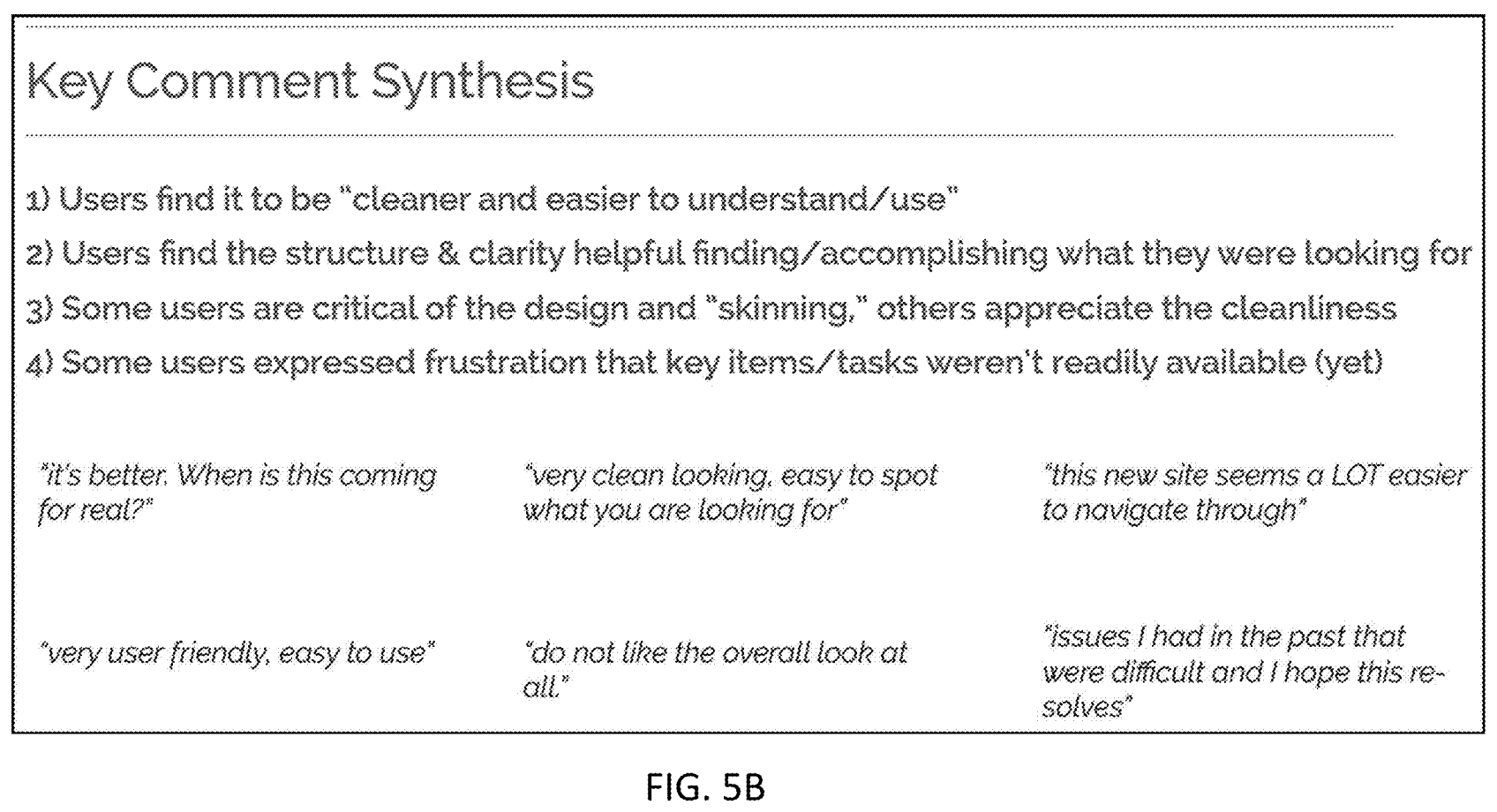

Key Comment Synthesis

1) Users find it to be "cleaner and easier to understand/use"

2) Users find the structure & clarity helpful finding/accomplishing what they were looking for 3) Some users are critical of the design and "skinning," others appreciate the cleanliness 4) Some users expressed frustration that key items/tasks weren't readily available (yet)

*"it's better. When is this coming for real?"*

*"very user friendly, easy to use"*

*"very clean looking, easy to spot what you are looking for"*

*"do not like the overall look at all."*

*"this new site seems a LOT easier to navigate through"*

*"issues I had in the past that were difficult and I hope this re-solves"*

FIG. 5B

Attack type and action taken by provider

FIG. 5D

PLATFORM GENERATION SYSTEM AND METHOD

RELATED APPLICATIONS

This application claims benefit of and priority to U.S. Provisional Patent Application No. 63/578,060 filed Aug. 22, 2023 and titled "PLATFORM GENERATION SYSTEM AND METHOD," the entirety of which is hereby incorporated by reference.

FIELD

Embodiments relate generally to platform generation and management and more particularly to generating and managing digital platforms.

BACKGROUND

Digital transformation involves the integration of digital technology into aspects of a business, fundamentally changing how organizations operate and deliver value to customers. It encompasses a range of activities such as adopting new digital tools, enhancing online services, optimizing data analytics, improving user experiences, and automating processes. For content providers such as websites, digital transformation often involves leveraging technology to improve content delivery, boost user engagement, and increase overall efficiency.

SUMMARY

In the current climate of rapid technological advancement, increased data dependency, growing accessibility requirements, and a focus on user experience, techniques for facilitating digital transformations need to evolve and align with changing conditions to remain relevant and effective. While digital transformation offers significant opportunities for content providers to enhance their services and operations, it also presents a range of challenges that must be carefully managed to ensure successful outcomes. Digital transformation for websites and content providers, for example, often involves navigating several key challenges. Legacy systems may require costly upgrades to meet modern demands, while managing and analyzing vast amounts of data is crucial for effective personalization and user engagement. Keeping user interfaces up-to-date with evolving expectations can necessitate continuous design improvements. Additionally, robust cybersecurity measures can be essential to protect against increasing threats, and compliance with data privacy regulations can add further complexity. Managing and delivering content across multiple platforms can require flexible, scalable Content Management Systems (CMS). Cultural resistance within organizations can hinder the adoption of new technologies, making change management and workforce adaptation critical. Ongoing innovation can be constrained by budget limitations. Integrating new technologies like AI and machine learning presents additional challenges, as does ensuring scalability and maintaining high performance as platforms grow. Despite these challenges, successful digital transformation can significantly enhance content delivery and overall user experience.

Provided are embodiments for generating and managing digital platforms, such as websites. Certain embodiments include a discovery process, a strategy process, an execution process, and an iteration process to develop, deploy, and iteratively improve a digital platform, such as a website or other digital content delivery platform. In some embodiments, the discovery process includes conducting discovery of an existing platform to determine a digital architecture for the platform. This may include the initial collection and analysis of informational data, such as the collection of analytical data regarding the client's platform, analysis of the platform's performance, and the establishment of success factors. Forms of data collection may include, for example, the conduction of interviews, surveys, and performance assessments. The data collected may be relevant to the client, content developers, or end-users. Embodiments of end-user data may be end-user experiences and expectations regarding the client's platform. Discovery also may include an audit process. The audit process may include the scrutinization and assessment of areas regarding current environments, platforms, architectures, content, analytics, trends, stakeholder perspectives, and customer feedback. The assessment of platforms may include assessing a platform's capacities, pitfalls, functionalities, and overall efficiency. Statistics collected and observed during the audit process may include, for example, usage trends, pain points, platform performance, and customer-targeted outcomes. Success factors may be a culmination of the data collected and analyzed. These factors may be presented to the customer and may serve as a guide during the following processes to ensure the expected outcome is achieved. For example, success factors may include identifying the resources, tools, and technology required for a successful transformation. The process may include Data Analytics and User Research.

In some embodiments, the strategy process includes employment of a solution evaluation environment that is based in part on the information collected from discovery. The strategy process may include selecting an optimal solution and constructing a resulting strategy for how to proceed. Factors of consideration for solution selection may include technical tradeoffs, estimated service disruptions, approximated recurring costs, and an overall solution rating. The weighted criteria of this solution rating may include cost, performance, and sustainability. Strategies may need to be developed for all areas of the platform. These strategies may include a product strategy, a general platform strategy, a security strategy, a compliance strategy, a governance strategy, and an operations/management strategy. Examples of potential security strategy implementations may include identity and access management (IAM), multi-factor authentication (MFA), user privileges, transport layer security (TLS), data encryption, compliance/vulnerability scans, and continuous monitoring. Examples of potential platform strategy implementations may include Content Management Systems (CMS), Content Delivery Networks (CDN), cloud host solutions, email automation, marketing solutions, and performance monitoring tools. A compliance strategy may encompass achieving standards like 508 compliance, NIST certification, FedRAMP approval, and federal certification. An operations/management strategy may include, for example, a change management process and a delivery roadmap. The factors considered when developing these various strategies may include product operation, end-user experience, product/service management, installation, continuous integration and sustainment, performance requirements, downtime management, regulations compliance, and customer concerns and satisfaction. The process may include Data Governance, Cloud Security, and DevOps Integration.

In some embodiments, the execution process includes the employment of a platform transformation that occurs once a strategic plan has been developed. Platform transformation may comprise development, integration, and testing. Development may include developing the system, cloud infrastructure, information architecture, and security for the new platform. System development may include, for example, constructing code bases, templates, and digital interfaces. System development may be achieved through full stack development. The types of security developed may, for example, include data, cloud, platform, network, and browser security. Integration may comprise the incorporation of functional data into the newly developed platform. Testing may be conducted with test automation, which is the utilization of advanced testing tools and techniques to validate the platform's functionality automatically. Testing may include the utilization of staging environments, product simulations, and digital twins. Testing may be intended to simulate, identify vulnerabilities, and resolve errors and potential disruptions regarding the new platform. Simulation may include simulating the building, launching, editing, and functionality of the platform. Execution may also include platform launch, which can encompass a methodical launch sequence and comprehensive deployment plans. The process may include Data Integration, Cloud Architecture, Cloud Security, Cloud Optimization, Test Automation, Agile Methodology and User Training.

In some embodiments, the iteration process includes an iterative update system that may encompass continuous analysis and continuous updates to the new platform. The iteration process may include the use of Agile teams. Agile teams may be used to support iterative updates. Continuous analysis may include tracking and analyzing user feedback, client goals, policy changes, content development requirements, and various maintenance improvements. Methods of tracking and analyzing this information may include the constant study of data analytics, the facilitation of focus group sessions, and the leveraging of user insight and feedback. The process may have an element of continuous monitoring. Continuous monitoring may include 24/7 coverage for maintenance, support, and emergency response. Continuous monitoring may be provided by specialized teams. Continuous updates may include, for example, platform upgrades, the integration of new technology, improved cloud and information infrastructure, and improved security methods. The process may include Data Governance, Data Analytics, Agile Methodology, User Research, and User Training.

Provided in some embodiments is a platform generation and management system including: a platform engine adapted to deploy a content delivery platform, the platform engine including: a discovery engine adapted to perform a discovery operation to determine platform solution components, the discovery operation including: obtaining platform operational data, the platform operational data including: platform configuration data indicative of a first configuration of the content delivery platform; platform performance data indicative of performance of the first configuration of the content delivery platform; and platform response data indicative of user interaction with the first configuration of the content delivery platform; determining, based on the platform operational data, operational conditions associated with the first configuration of the content delivery platform; and determining, based on the operational conditions associated with the first configuration of the content delivery platform, the platform solution components; a strategy engine adapted to perform a strategy operation to determine a platform solution, the strategy operation including: determining, based on the platform solution components, one or more potential platform solutions; and determining, based on the one or more potential platform solutions, a platform solution; an execution engine adapted to perform an execution operation, the execution operation including: validating the platform solution determined to generate a validated platform solution; and deploying, in a platform execution environment, the validated platform solution as a second configuration of the content delivery platform to deliver content to one or more users; and an iteration engine adapted to perform an iteration operation to determine an updated platform solution, the iteration operation including: monitoring execution of the second configuration of the content delivery platform corresponding to the validated platform solution in the platform execution environment; and determining, based on the monitoring of the operation of the second configuration of the content delivery platform, an updated platform solution.

In some embodiments, the updated platform solution is deployed on a network to implement an updated version of the content delivery platform. In certain embodiments, where operational conditions are indicative of operational performance or user performance. In some embodiments, where the solution components include solution requirement or solution factors for generating platform modifications. In certain embodiments, each potential platform solution of the potential platform solutions includes a platform solution strategy, a platform solution rating, or a platform solution factor. In some embodiments, determining a platform solution includes determining solution scores for the one or more potential platform solutions and selecting the platform solution based on the solution scores. In certain embodiments, where deploying the validated platform solution to deliver content to one or more users includes executing architecture and security solution, a design solution, a content development solution, a technical development, a document solution, a testing and simulation solution, or a launch solution to deliver content to one or more users. In some embodiments, where the updated platform solution is validated to generate an updated validated solution, and where the updated validated solution is deployed in the platform execution environment as a third configuration of the content delivery platform to deliver content to one or more users. In certain embodiments, the content delivery platform includes an Internet website.

Provided in some embodiments is a platform generation and management method including: conducting a discovery operation to determine platform solution components, the discovery operation including: obtaining, by a platform engine, platform operational data, the platform operational data including: platform configuration data indicative of a first configuration of a content delivery platform; platform performance data indicative of performance of the first configuration of the content delivery platform; and platform response data indicative of user interaction with the first configuration of the content delivery platform; determining, based on the platform operational data, operational conditions associated with a first configuration of the content delivery platform; and determining, based on the operational conditions associated with the first configuration of the content delivery platform, the platform solution components; conducting a strategy operation to determine a platform solution, the strategy operation including: determining, based on the platform solution components, one or more potential platform solutions; and determining, based on the one or more potential platform solutions, a platform solution; conducting an execution operation, the execution operation including: validating the platform solution determined to generate a validated platform solution; and deploying, in a platform execution environment, the validated platform solution as a second configuration of the content delivery platform to deliver content to one or more users; and conducting an iteration operation to determine an updated platform solution, the iteration operation including: monitoring execution of the second configuration of the content delivery platform corresponding to the validated platform solution in the platform execution environment; and determining, based on the monitoring of the operation of the second configuration of the content delivery platform, an updated platform solution. In certain embodiments, the updated platform solution is deployed on a network to implement an updated version of the content delivery platform. In some embodiments, where operational conditions are indicative of operational performance or user performance. In some embodiments, where the solution components include solution requirement or solution factors for generating platform modifications. In certain embodiments, each potential platform solution of the potential platform solutions includes a platform solution strategy, a platform solution rating, or a platform solution factor. In some embodiments, determining a platform solution includes determining solution scores for the one or more potential platform solutions and selecting the platform solution based on the solution scores. In certain embodiments, where deploying the validated platform solution to deliver content to one or more users includes executing architecture and security solution, a design solution, a content development solution, a technical development, a document solution, a testing and simulation solution, or a launch solution to deliver content to one or more users. In some embodiments, where the updated platform solution is validated to generate an updated validated solution, and where the updated validated solution is deployed in the platform execution environment as a third configuration of the content delivery platform to deliver content to one or more users. In certain embodiments, the content delivery platform includes an Internet website.

Provided in some embodiments is a non-transitory computer-readable storage medium including program instructions stored thereon that are executable by a processor to cause operations for platform generation and management, the operations including: conducting a discovery operation to determine platform solution components, the discovery operation including: obtaining, by a platform engine, platform operational data, the platform operational data including: platform configuration data indicative of a first configuration of a content delivery platform; platform performance data indicative of performance of the first configuration of the content delivery platform; and platform response data indicative of user interaction with the first configuration of the content delivery platform; determining, based on the platform operational data, operational conditions associated with a first configuration of the content delivery platform; and determining, based on the operational conditions associated with the first configuration of the content delivery platform, the platform solution components; conducting a strategy operation to determine a platform solution, the strategy operation including: determining, based on the platform solution components, one or more potential platform solutions; and determining, based on the one or more potential platform solutions, a platform solution; conducting an execution operation, the execution operation including: validating the platform solution determined to generate a validated platform solution; and deploying, in a platform execution environment, the validated platform solution as a second configuration of the content delivery platform to deliver content to one or more users; and conducting an iteration operation to determine an updated platform solution, the iteration operation including: monitoring execution of the second configuration of the content delivery platform corresponding to the validated platform solution in the platform execution environment; and determining, based on the monitoring of the operation of the second configuration of the content delivery platform, an updated platform solution.

BRIEF DESCRIPTION OF THE DRAWINGS

FIG. 3A is a diagram that illustrates example platform operational data in accordance with one or more embodiments.

FIG. 3B is a diagram that illustrates example audit criteria in accordance with one or more embodiments.

FIG. 3C is a diagram that illustrates example operational conditions in accordance with one or more embodiments.

FIG. 3D is a diagram that illustrates a user/customer experience assessment in accordance with one or more embodiments.

FIG. 3E is a diagram that illustrates a customer pain point assessment in accordance with one or more embodiments.

FIG. 3H is a diagram that illustrates example solution requirements in accordance with one or more embodiments.

FIG. 3I is a diagram that illustrates example solution success factors in accordance with one or more embodiments.

FIG. 4A is a diagram that illustrates example solution evaluation criteria matrix in accordance with one or more embodiments.

FIG. 4D is a diagram that illustrates an example security strategy in accordance with one or more embodiments.

FIG. 4F is a diagram that illustrates an example operations and management strategy in accordance with one or more embodiments.

FIG. 5B is a diagram that illustrates an example user feedback/improvement synthesis in accordance with one or more embodiments.

FIG. 5D is a diagram that illustrates an example security management in accordance with one or more embodiments.

Figure 1:
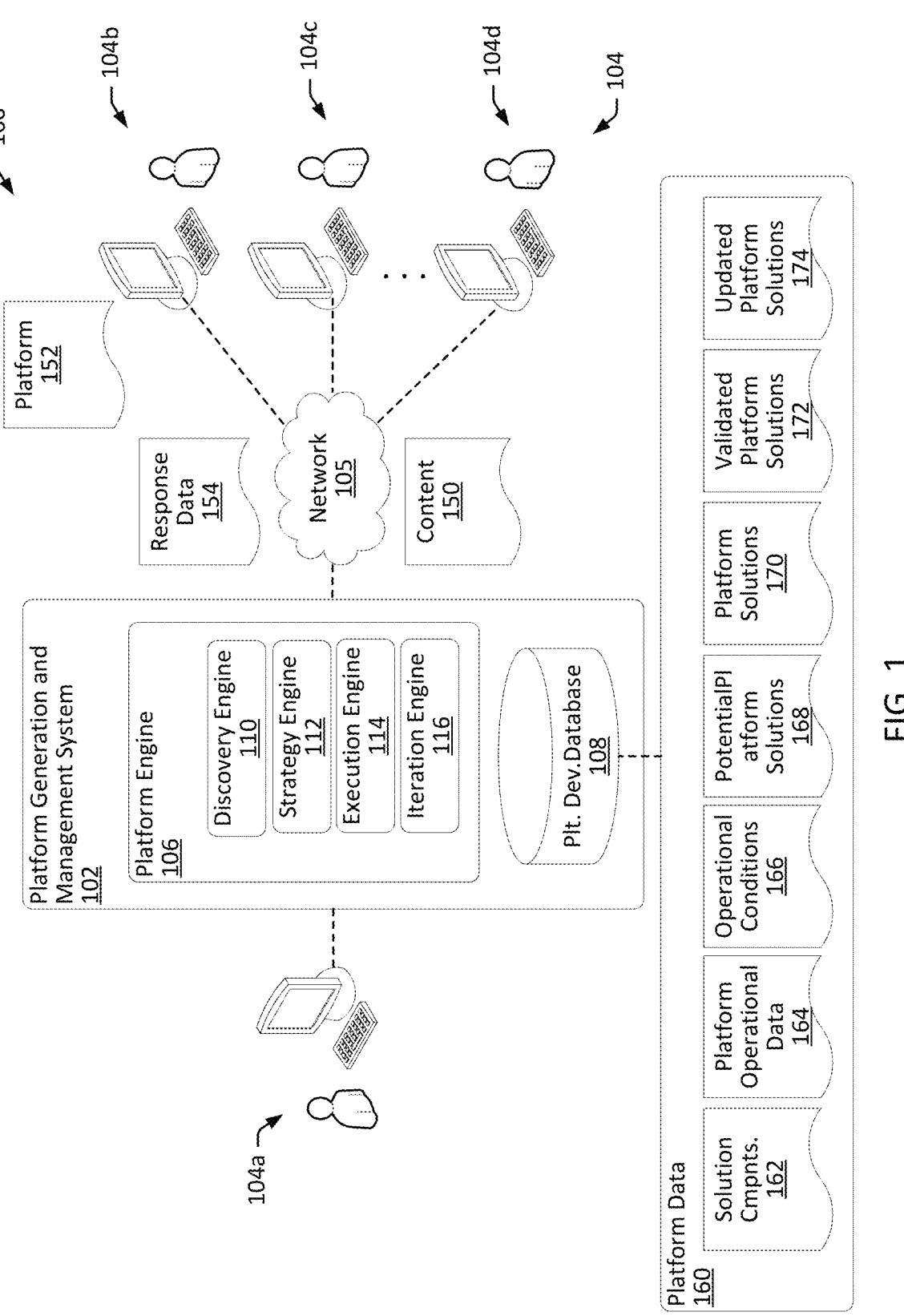
FIG. 1 is diagram that illustrates a platform generation and management environment in accordance with one or more embodiments.

While this disclosure is susceptible to various modifications and alternative forms, specific example embodiments are shown and described. The drawings may not be to scale. The drawings and the detailed description are not intended to limit the disclosure to the form disclosed, but are intended to disclose modifications, equivalents, and alternatives falling within the spirit and scope of the present disclosure as defined by the claims.

DETAILED DESCRIPTION

Described are embodiments for generating and managing digital platforms. In some embodiments, the discovery process includes conducting discovery of an existing platform to determine a digital architecture for the platform. This may include the initial collection and analysis of informational data, such as the collection of analytical data regarding the client's platform, analysis of the platform's performance, and the establishment of success factors. Forms of data collection may include, for example, the conduction of interviews, surveys, and performance assessments. The data collected may be relevant to the client, content developers, or end-users. Embodiments of end-user data may be end-user experiences and expectations regarding the client's platform. Discovery also may include an audit process. The audit process may include the scrutinization and assessment of areas regarding current environments, platforms, architectures, content, analytics, trends, stakeholder perspectives, and customer feedback. The assessment of platforms may include assessing a platform's capacities, pitfalls, functionalities, and overall efficiency. Statistics collected and observed during the audit process may include, for example, usage trends, pain points, platform performance, and customer-targeted outcomes. Success factors may be a culmination of the data collected and analyzed. These factors may be presented to the customer and may serve as a guide during the following processes to ensure the expected outcome is achieved. For example, success factors may include identifying the resources, tools, and technology required for a successful transformation. The process may include Data Analytics and User Research.

In some embodiments, the strategy process includes employment of a solution evaluation environment that is based in part on the information collected from discovery. The strategy process may include selecting an optimal solution and constructing a resulting strategy for how to proceed. Factors of consideration for solution selection may include technical tradeoffs, estimated service disruptions, approximated recurring costs, and an overall solution rating. The weighted criteria of this solution rating may include cost, performance, and sustainability. Strategies may need to be developed for all areas of the platform. These strategies may include a product strategy, a general platform strategy, a security strategy, a compliance strategy, a governance strategy, and an operations/management strategy. Examples of potential security strategy implementations may include identity and access management (IAM), multi-factor authentication (MFA), user privileges, transport layer security (TLS), data encryption, compliance/vulnerability scans, and continuous monitoring. Examples of potential platform strategy implementations may include Content Management Systems (CMS), Content Delivery Networks (CDN), cloud host solutions, email automation, marketing solutions, and performance monitoring tools. A compliance strategy may encompass achieving standards like 508 compliance, NIST certification, FedRAMP approval, and federal certification. An operations/management strategy may include, for example, a change management process and a delivery roadmap. The factors considered when developing these various strategies may include product operation, end-user experience, product/service management, installation, continuous integration and sustainment, performance requirements, downtime management, regulations compliance, and customer concerns and satisfaction. The process may include Data Governance, Cloud Security, and DevOps Integration.

In some embodiments, the execution process includes the employment of a platform transformation that occurs once a strategic plan has been developed. Platform transformation may comprise development, integration, and testing. Development may include developing the system, cloud infrastructure, information architecture, and security for the new platform. System development may include, for example, constructing code bases, templates, and digital interfaces. System development may be achieved through full stack development. The types of security developed may, for example, include data, cloud, platform, network, and browser security. Integration may comprise the incorporation of functional data into the newly developed platform. Testing may be conducted with test automation, which is the utilization of advanced testing tools and techniques to validate the platform's functionality automatically. Testing may include the utilization of staging environments, product simulations, and digital twins. Testing may be intended to simulate, identify vulnerabilities, and resolve errors and potential disruptions regarding the new platform. Simulation may include simulating the building, launching, editing, and functionality of the platform. Execution may also include platform launch, which can encompass a methodical launch sequence and comprehensive deployment plans. The process may include Data Integration, Cloud Architecture, Cloud Security, Cloud Optimization, Test Automation, Agile Methodology and User Training.

In some embodiments, the iteration process includes an iterative update system that may encompass continuous analysis and continuous updates to the new platform. The iteration process may include the use of Agile teams. Agile teams may be used to support iterative updates. Continuous analysis may include tracking and analyzing user feedback, client goals, policy changes, content development requirements, and various maintenance improvements. Methods of tracking and analyzing this information may include the constant study of data analytics, the facilitation of focus group sessions, and the leveraging of user insight and feedback. The process may have an element of continuous monitoring. Continuous monitoring may include 24/7 coverage for maintenance, support, and emergency response. Continuous monitoring may be provided by specialized teams. Continuous updates may include, for example, platform upgrades, the integration of new technology, improved cloud and information infrastructure, and improved security methods. The process may include Data Governance, Data Analytics, Agile Methodology, User Research, and User Training.

Although certain example embodiments are described in certain context, such as educational websites, for the purpose of illustration, embodiments may be employed in any suitable context, such as in other types of websites, other forms of electronic content delivery, or the like.

FIG. 1 is a diagram that illustrates a content delivery environment ("environment") 100 in accordance with one or more embodiments. In the illustrated embodiment, environment 100 includes a content delivery platform generation and management system ("system") 102 and associated users 104 (e.g., user 104a and users 104b-d communicatively coupled to system 102 by way of an electronics communications network ("network") 105).

In some embodiments, system 102 is configured to deploy, manage, and iteratively update a content delivery platform, such as a website for delivering digital content to users 104. System 102 may, for example, be operable to perform operations of platform generation and management, such as those of platform generation and management method 200 described here. As illustrated, system 102 may include several engines (e.g., software modules), each executing specific tasks to improve platform efficiency and adaptability based on operational data, strategic insights, and user feedback. This may include a discovery operation (e.g., including assessment of the context of a platform), a strategy operation (e.g., including assessing and identifying potential/recommended platform solutions (or "strategies") based on the assessment), an execution operation (e.g., that includes executing a recommended solution), and an iteration operation that includes monitoring execution of a currently deployed solution and iteratively modifying (or "updating") the solution and its execution based on the monitoring).

In the illustrated embodiment, system 102 includes a platform development engine ("platform engine") 106 and a platform development database ("database") 108. As depicted, platform engine 106 may include a discovery engine 110 (e.g., a software module adapted to perform a discovery operation of method 200), a strategy engine 112 (e.g., a software module adapted to perform a strategy operation of method 200), an execution engine 114 (e.g., a software module adapted to perform an execution operation of method 200), and an iteration engine 116 (e.g., a software module adapted to perform an iteration operation of method 200). In some embodiments, system 102 includes a computer system, which may be the same or similar to computer system 1000 described with regard to at least FIG. 6. Database 108 may include memory device database having structured collection of organized data stored electronically thereon, allowing for efficient retrieval, management, and processing of information. Network 105 may be a system of interconnected devices and transmission pathways that enables the exchange of data and information between multiple nodes using electrical, optical, or wireless signals, such as the internet, a cellular network, a local area network (LAN), wide area network (WAN), a wired network, a wireless network, or the like.

In some embodiments, a user 104 is or includes a person or other entity for providing corresponding user operations described here. For example, a first user 104a may be a human developer (or a development system) tasked with conducting one or more operations (e.g., discovery, strategy, execution iteration, or the like operations) described regarding operation of system 102. A second user 104a may be a human tester (or a test system) tasked with operating providing response data, such as test-user feedback, concerning operational aspects of a developed solution (e.g., a beta tester for a test version of a website platform), and third and fourth users 104c and 104d may be human end-users (or a connected user system) (or "customers") that interact with a deployed solution (e.g., a currently released version of the website platform that is executing on a server) and provide response data, such as end-user feedback. As described, platform content 150 may be provided to one or more users 104 (e.g., users 104b, 104c, or 104d) via a deployed platform

152 (e.g., a deployed website), and response data 154 (e.g., concerning interaction and experience of users 104) may be obtained and employed by system 102 (e.g., by way of platform 152) to generate and deploy an "improved" platform solution. As described, platform data 160 may include platform solution components 162 (e.g., including platform requirements, success factors, or the like), platform operational data 164 (e.g., configuration data, performance data, response data, or the like), operational conditions 166 (e.g., capacity, deficiency, capabilities, or efficiency, usage trends, pain points, performance, or outcomes, or the like), potential platform solutions 168 (e.g., candidates solutions for deployment), platform solutions 170 (e.g., solutions identified for deployment), validated platform solutions 172 (e.g., solutions identified for deployment that are validated for deployment), and updated platform solutions 174 (e.g., platform solutions that are generated based on monitoring of a corresponding deployed platform solution).

In some embodiments, platform engine 106 is operable to develop, deploy, monitor and update a content delivery platform 152. For example, platform engine 106 may be operable to deploy an educational website type content delivery platform 152 that provides educational articles and videos to users 104. In some embodiments, platform engine 106 coordinates infrastructure operations of content delivery platform 152. Continuing with the prior example, platform engine 106 may coordinate operations of discovery engine 110, strategy engine 112, execution engine 114, and iteration engine 116 to effectively and efficiently offer and deliver educational articles and videos to users 104, ensuring case of navigation of the website and high-quality delivery of educational articles and videos to interested users 104. Although certain embodiments are described in the context of an operation being performed by a given entity, such as system 102, a user 104, platform engine 106, discovery engine 110, strategy engine 112, execution engine 114, or iteration engine 116, for the purpose of explanation and illustration, embodiments may include operations performed by any suitable entity. For example, a user, such as a website developer, may perform certain operations described with regard to system 102, platform engine 106, discovery engine 110, strategy engine 112, execution engine 114, or iteration engine 116.

Figure 2:
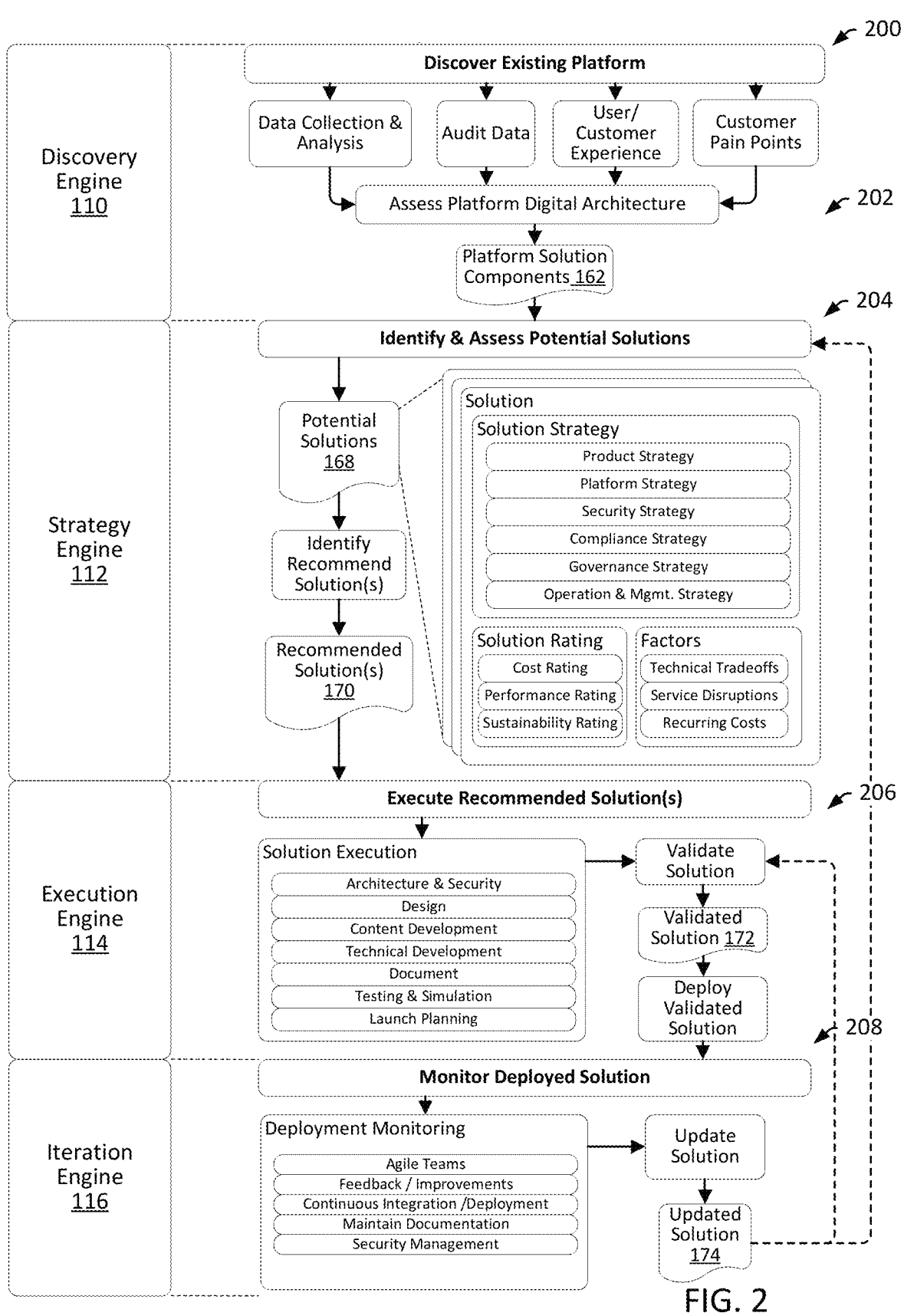
FIG. 2 is diagram that illustrates a platform generation and management method in accordance with one or more embodiments.

FIG. 2 is diagram that illustrates a platform generation and management method 200 in accordance with one or more embodiments. Some or all of the operations of method 200 may be performed by system 100 or another entity, such as one or more of users 104. For example, as described some or all of the procedural aspects of discovery, strategy, execution and iteration operation (or "processes" or "phases") may be performed by discovery engine 110, strategy engine 112, execution engine 114, or iteration engine 116, respectively.

In some embodiments, discovery engine 110 is operable to perform a discovery operation to determine platform solution components 162. For example, discovery engine 110 may perform a discovery operation 202 that includes obtaining platform operational data 164 (e.g., obtained by way of data collection and analysis, auditing, monitoring of user/customer experience, and identification of user/customer issues (or "pain points")), determining (e.g., in a platform digital architecture assessment based on platform operational data 164) operational conditions 166 associated with a currently employed configuration of content delivery platform 152, and determining (e.g., based on the operational conditions 166), corresponding platform solution components 162. Platform operational data 164 may include, for example, platform configuration data (e.g., indicative the current configuration of content delivery platform 152), platform performance data (e.g., indicative of performance of the current configuration of content delivery platform 152, and platform response data 154 (e.g., indicative of user interaction with the current configuration of content delivery platform 152). Platform configuration data may include settings such as server configurations, content layout templates, user access controls, and caching policies that dictate how the site functions and serves content to users. In the context of a website that delivers educational articles and videos, platform configuration data may include parameters like content categorization schemes for different subjects, video streaming settings, user role permissions for accessing premium content, and integration settings for quizzes and progress tracking features. In some embodiments, operational conditions include obtained metrics indicative of operational performance (e.g., capacity, efficiency, capabilities/deficiencies) or user performance (e.g., usage trends, user complications (or "pain points"), outcomes) of content delivery platform 152. Operational conditions may include factors such as server capacity, website efficiency in loading times, capabilities like handling peak traffic, deficiencies such as slow page response during high usage, usage trends indicating popular pages, user complications such as difficulty navigating the interface, and overall outcomes like increased bounce rates. In the context of a website that delivers educational articles and videos, operational conditions may include, for example, the platform's capacity to stream multiple videos simultaneously, the efficiency of content loading during peak usage times, capabilities such as delivering personalized learning paths, deficiencies like video buffering during high traffic, usage trends highlighting popular courses or articles, user complications like difficulty finding relevant materials, and outcomes such as improved course completion rates or lower engagement due to navigation issues. In some embodiments, solution components identify items (e.g., solution requirements/success factors) for generating platform modifications. Solution components may include requirements such as responsive design, content management integration, SEO optimization, and success factors like user engagement, scalability, and fast load times to ensure a smooth user experience. In the context of a website that delivers educational articles and videos, solution components may include requirements such as adaptive learning pathways, video hosting and streaming capabilities, user progress tracking systems, and success factors like high user retention, improved course completion rates, and seamless integration of multimedia content to enhance educational outcomes.

Information obtained during the discovery operation may, for example, be utilized to build a comprehensive understanding of customer and end user needs, ensuring that the new digital solutions provide enhanced digital interactions. This phase may document and address identified needs to ensure desired outcomes are met. Through interviews, surveys, and performance assessments, the discovery process may define specific requirements of people involved. It may also take into account an entire user experience by gathering data from content developers and end users. Data analytics may be employed, for example, to assess user trends, pain points, and performance metrics, supporting strategic decision-making and optimizing services. The discovery phase may operate to identify resources, tools, and technologies to facilitate a successful digital transformation of the associated content delivery platform 152.

Figure 3F:
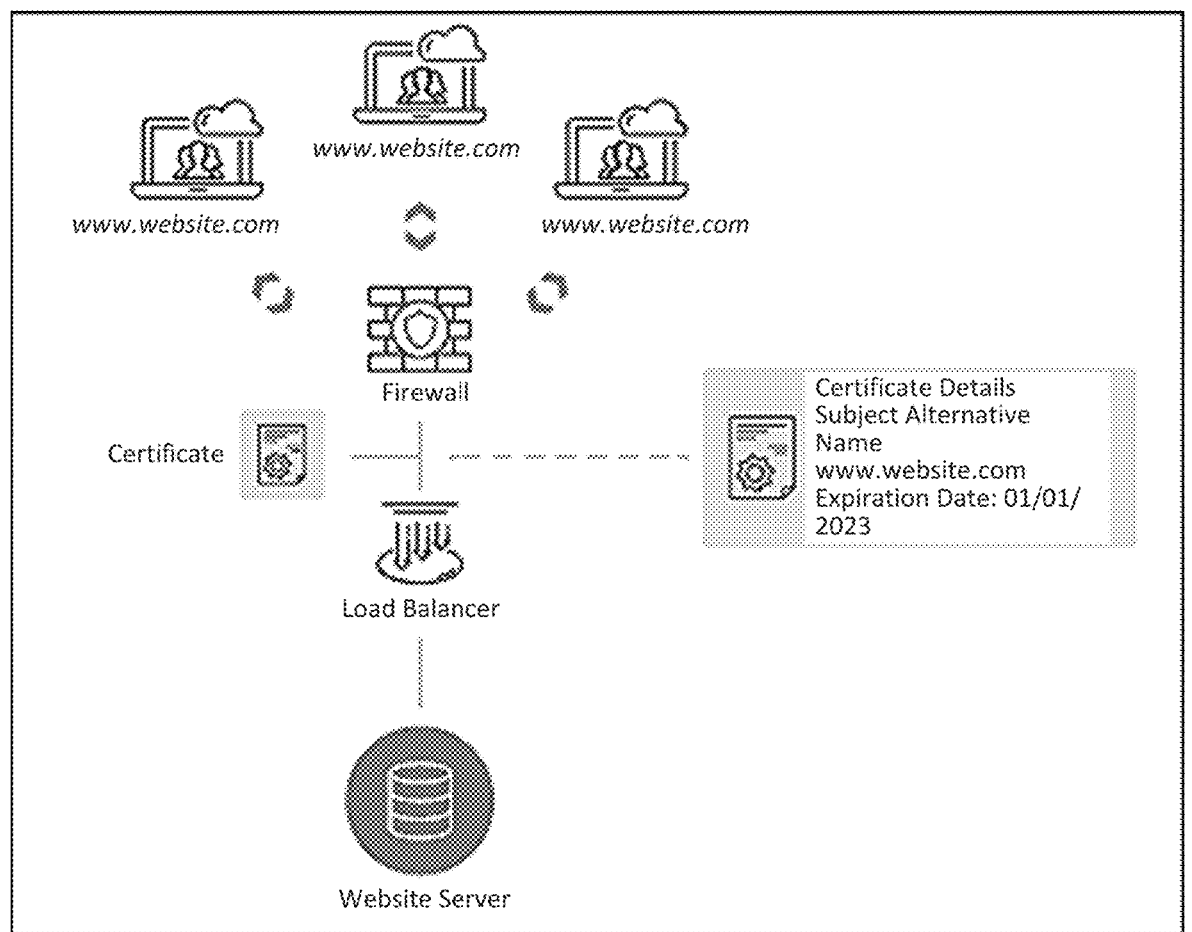
FIGS. 3F and 3G are diagrams that illustrate platform architecture assessment in accordance with one or more embodiments.
Figure 3G:
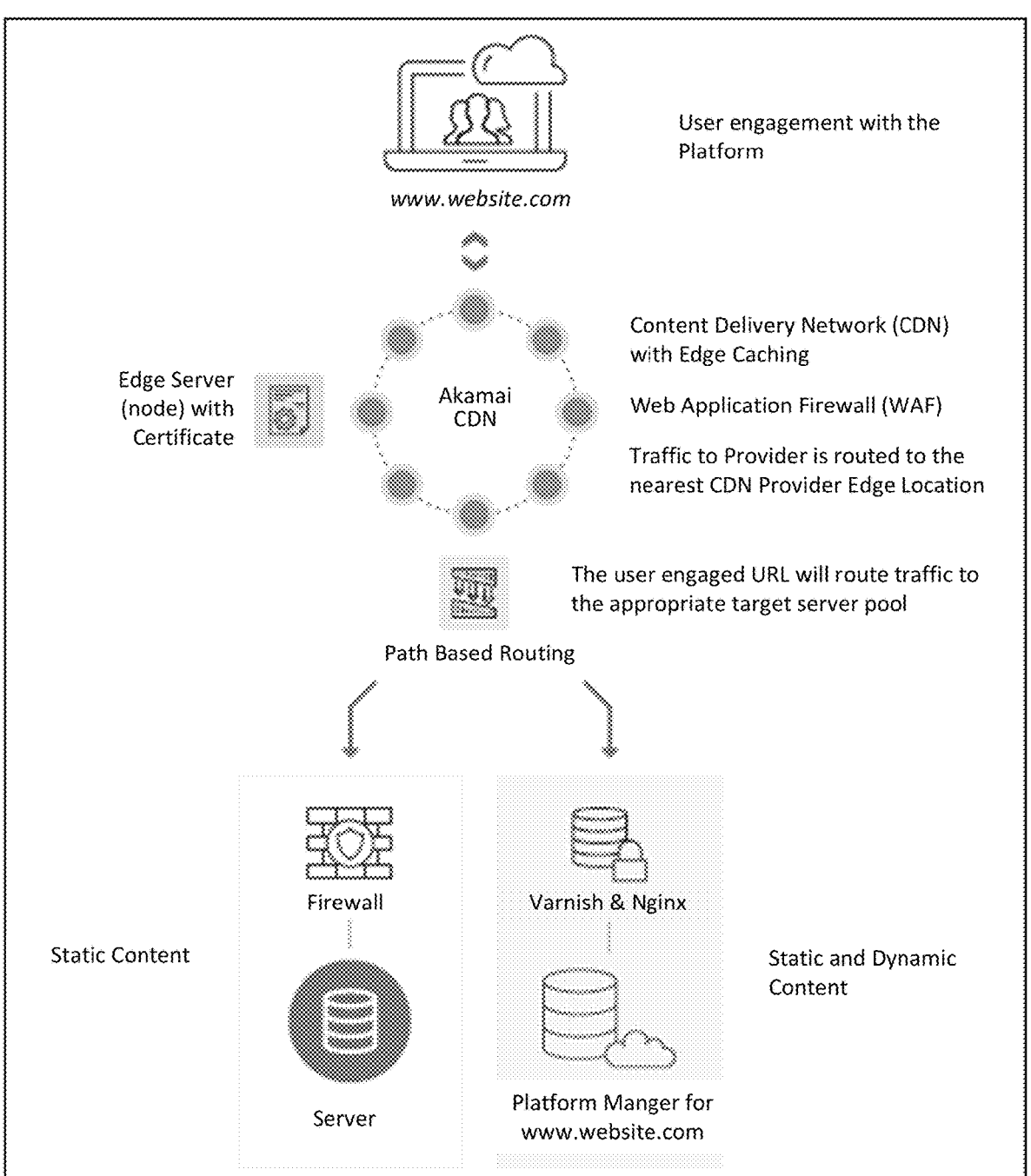

FIG. 3A is a diagram that illustrates example platform operational data 164 in accordance with one or more embodiments. In the illustrated embodiment, platform operational data 164 information about existing digital platforms, architectures, and user interactions, which may, for example, be subjected to an auditing process to determine associated operation conditions. FIG. 3B is a diagram that illustrates example audit criteria in accordance with one or more embodiments. Such criteria may, for example, be employed in an audit of platform operational data (e.g., platform operational data 164 of FIG. 3A) to generate corresponding audit results, including operational conditions 166. FIG. 3C is a diagram that illustrates example operational conditions 166 in accordance with one or more embodiments. The illustrated operational conditions 166 may be generated based on application of audit criteria of FIG. 3B to platform operational data 164 of FIG. 3A. The first/top section includes metrics associated with user page visits and views, the second/middle section includes metrics associated with unique user visits and time spent on webpages, and the third/bottom section includes metrics associated with bounce rates for users. FIG. 3D is a diagram that illustrates a user/customer experience assessment in accordance with one or more embodiments. Such an assessment may be generated by a human developer (or a development system) (e.g., by way of application of generative artificial intelligence (AI) or similar techniques to platform operational data 164 of FIG. 3A or operational conditions 166 of FIG. 3C). The assessment may indicate how end-users and customers interact with current digital solutions and ensure new/updated solutions align with user and customer needs. FIG. 3E is a diagram that illustrates a customer pain point assessment in accordance with one or more embodiments. Such an assessment may be generated by a human developer (or a development system) (e.g., by way of application of generative AI to platform operational data 164 of FIG. 3A or operational conditions 166 of FIG. 3C). The assessment may identify common issues (or "pain points") experienced by customers, ensuring the new solutions enhance user satisfaction. FIGS. 3F and 3G are diagrams that illustrate platform architecture assessment in accordance with one or more embodiments. FIG. 3F illustrates an existing/current digital architecture of a system including existing operational conditions 166 (e.g., indicating current suitability and performance, and enabling identification of areas for improvement). FIG. 3G illustrates a proposed digital architecture of a system, including platform solution components 162 (and configuration thereof) of a proposed platform solution corresponding. FIG. 3H is a diagram that illustrates example solution requirements in accordance with one or more embodiments. Solution requirements, for example, define and document the requirements for the new solutions, ensuring all required aspects are implemented in a corresponding platform solution. FIG. 3I is a diagram that illustrates example solution success factors in accordance with one or more embodiments. Solution success factors may, for example, identify and documents benchmarks for assessing the effectiveness of a new platform solution, which can, in turn, be used to assess the success of a corresponding platform solution.

In some embodiments, strategy engine 112 is operable to perform a strategy operation to determine a platform solution 170. For example, strategy engine 112 may perform a strategy operation 204 that includes determining (e.g., based on determined platform solution components 162), one or more potential platform solutions 168, and determining (e.g., based on one or more potential platform solutions 168 determined), a platform solution 170. In some embodiments, each potential platform solution of the potential platform solutions 168 includes a solution strategy, a solution rating indicative of a rating (e.g., a scoring) of the solution strategy, and a solution factor indicative of relevant components of the solution strategy. A solution strategy for a potential platform solution may include, for example, a product strategy, a platform strategy, a security strategy, a compliance strategy, a governance strategy, or operation/management strategy for the potential platform solution.

Platform strategy may be a plan that outlines the vision, goals, and roadmap for a specific product or service, focusing on how it will meet customer needs, compete in the market, and evolve over time. In the context of a website that delivers educational articles and videos, the product strategy may involve setting clear goals to provide diverse and interactive learning materials, expanding the content library based on user demand, and developing new features like personalized learning tracks to increase user engagement. Platform Strategy may be a strategy that defines how a platform will be structured, supported, and managed, focusing on scalability, flexibility, and the technology stack to support various functions and services. In the context of a website that delivers educational articles and videos, the platform strategy may focus on using a modular, cloud-based infrastructure to ensure that the website can easily scale as the number of users grows and new content types (e.g., videos, quizzes) are introduced without causing disruptions. Security strategy may be a set of measures and practices designed to protect a platform, its data, and its users from cyber threats, including encryption, authentication, and access control. In the context of a website that delivers educational articles and videos, the security strategy may involve implementing secure user authentication, encrypted data transmission, and secure access control for sensitive user data, such as progress tracking and personal information. Compliance strategy may be a plan to ensure that the platform adheres to relevant regulations, standards, and laws, particularly regarding data privacy, accessibility, and industry-specific rules. In the context of a website that delivers educational articles and videos, the compliance strategy may ensure that the website adheres to GDPR for data privacy, meets accessibility standards such as WCAG to support users with disabilities, and complies with educational regulations like FERPA for protecting student information. Governance strategy may be a framework that establishes policies, procedures, and accountability mechanisms for decision-making, resource allocation, and the management of the platform to ensure alignment with organizational goals. In the context of a website that delivers educational articles and videos, the governance strategy may establish policies for content approval, set rules for content updates, and ensure that all stakeholders (educators, administrators, developers) follow a clear decision-making process to maintain the quality and integrity of the educational platform. Operation/Management Strategy may be a strategy focused on the day-to-day operations and long-term management of the platform, including maintenance, performance monitoring, updates, and user support. In the context of a website that delivers educational articles and videos, the operation/management strategy may involve regular content updates, performance monitoring to ensure smooth video playback, automated system backups, and user support teams to handle technical issues or inquiries from learners and educators.

A solution rating may be defined as a comprehensive assessment used to evaluate the effectiveness and suitability of a potential platform or solution in meeting specific business needs or objectives. This rating may take into account various factors such as cost, performance, sustainability, security, compliance, and other strategic elements, providing a holistic view of how well the solution aligns with the organization's goals and requirements. A cost rating may assess the overall expenses associated with implementing, maintaining, and operating the solution, including initial development costs, ongoing operational costs, potential hidden costs, and the total cost of ownership (TCO). For instance, in the context of a website that delivers educational articles and videos, the cost rating may indicate that the platform requires a subscription-based cloud hosting service. While the initial setup may be affordable, ongoing subscription fees and additional costs for storage and bandwidth may contribute to a moderate cost rating, requiring careful budgeting over time. A performance rating may evaluate how well the solution meets required functional and non-functional requirements, such as speed, responsiveness, scalability, uptime, and the ability to handle traffic and data load efficiently. For example, the performance rating for the educational website may be high if the platform is optimized for delivering video content, utilizing a content delivery network (CDN) to ensure fast load times and minimal buffering. This may be especially crucial during peak traffic periods, such as when new educational videos are released. A sustainability rating may measure the long-term viability of the solution, considering environmental, economic, and social impacts, including energy efficiency, resource utilization, and the potential for future upgrades. In the case of the educational website, a high sustainability rating may reflect the use of servers powered by renewable energy and the implementation of efficient compression algorithms for video content. This may demonstrate the platform's commitment to reducing its environmental footprint and ensuring long-term viability through efficient resource management.

A solution factor may be defined as a critical aspect or consideration that influences the decision-making process for selecting or implementing a potential platform solution. Solution factors may encompass various strategic, technical, operational, and financial elements that need to be evaluated to ensure the chosen solution aligns with the organization's objectives and requirements. A technical tradeoff may involve making a decision where certain technical advantages are prioritized over others, often leading to compromises in specific areas. For example, in the context of a website that delivers educational articles and videos, a technical tradeoff may occur when choosing between a platform that offers superior video quality but requires more bandwidth, versus one that provides faster load times but at the cost of slightly lower video resolution. The decision may depend on whether the organization prioritizes user experience in terms of video clarity or speed. A service disruption may refer to any event or circumstance that interrupts the normal operation of the platform, impacting the availability or performance of the website. For instance, a service disruption for an educational website may occur if the platform undergoes scheduled maintenance or experiences an unexpected server outage, temporarily preventing users from accessing articles or videos. This factor may require the organization to have contingency plans in place to minimize downtime and maintain user trust. Cost may refer to the financial expenditure associated with implementing and maintaining the platform solution. This may include upfront development costs, ongoing operational expenses, and any unforeseen costs that may arise. For an educational website, the cost factor may consider the expenses related to hosting services, content delivery networks (CDNs), and video storage. For example, if the website decides to use a high-quality CDN to ensure fast global access to videos, this may result in higher operational costs, which may need to be weighed against the benefit of improved user experience.

In some embodiment, a determined or platform solution 170 corresponds to a selected potential platform solution of the one or more potential platform solutions 168. For example, a first user 104a may be a human developer (or a development system) may select a given potential platform solution as a platform solution 170 based on an assessment of parameters of the solution, such as its solution strategy, rating, or factors. In some embodiments, a solution composite score may be generated for each of some or all of the one or more potential platform solutions 168 based on the solution rating for potential platform solution (e.g., an average or sum or the like of the cost, performance or stability rating for the potential platform solution), and the potential platform solution as the platform solution 170 based thereon. For example, a potential platform solution having the highest solution composite score from the solution composite scores of the one or more potential platform solutions 168 may be selected, the potential platform solution may be selected from one or more potential platform solutions 168 having a solution composite scores that satisfies a solution composite score threshold, or the like. In the context of selecting a platform solution for a website that delivers educational articles and videos, a solution composite score may be determined for two or more potential platform solutions by assessing various solution factors such as cost, performance, and sustainability. For example, suppose two potential platform solutions, Solution A and Solution B, are being evaluated. Solution A may have a high-performance rating due to its fast load times and ability to handle high traffic volumes, but it may come with higher costs due to premium hosting services and additional storage requirements. On the other hand, Solution B may have a moderate performance rating, offering adequate speed and scalability, but with a lower cost due to more affordable hosting options and less storage capacity. To determine the solution composite score for each potential platform, the ratings for each factor—such as cost, performance, and sustainability—may be aggregated. For instance, if Solution A has high ratings for performance but lower ratings for cost, while Solution B has moderate ratings across all factors, a composite score could be calculated by averaging or summing these ratings. If Solution A's composite score is higher due to its superior performance despite the higher cost, it may be selected as the platform solution 170. Alternatively, if Solution B's composite score meets a predetermined threshold, emphasizing a balance between cost and performance, it may be chosen as the more suitable platform solution 170. Ultimately, the selection of a platform solution may be based on the solution with the highest composite score or the one that best aligns with the organization's strategic priorities, such as budget constraints or performance requirements. This process ensures that the chosen platform solution is not only effective in delivering educational content but also sustainable and cost-efficient in the long term.

During the strategy operation, potential solutions for platform implementation are identified and evaluated based on the requirements established in the discovery phase, offering multiple courses of action. Recommendations are made using a data-driven approach, considering factors such as solution ratings, technical tradeoffs, service disruptions, and recurring costs. Experienced and trained teams or systems are deployed to execute digital services and generate optimal solutions. A dedicated lead may ensure seamless communication with the customer and successful project delivery. Software and interface standards can be incorporated to allow for future integration of emerging technologies without requiring a complete overhaul. The technology stack can be designed to be easily modifiable for continuous integration and delivery. Additionally, current regulations and potential future regulatory changes can be identified and accounted for to minimize disruption during development, deployment, or maintenance.

Figure 4B:
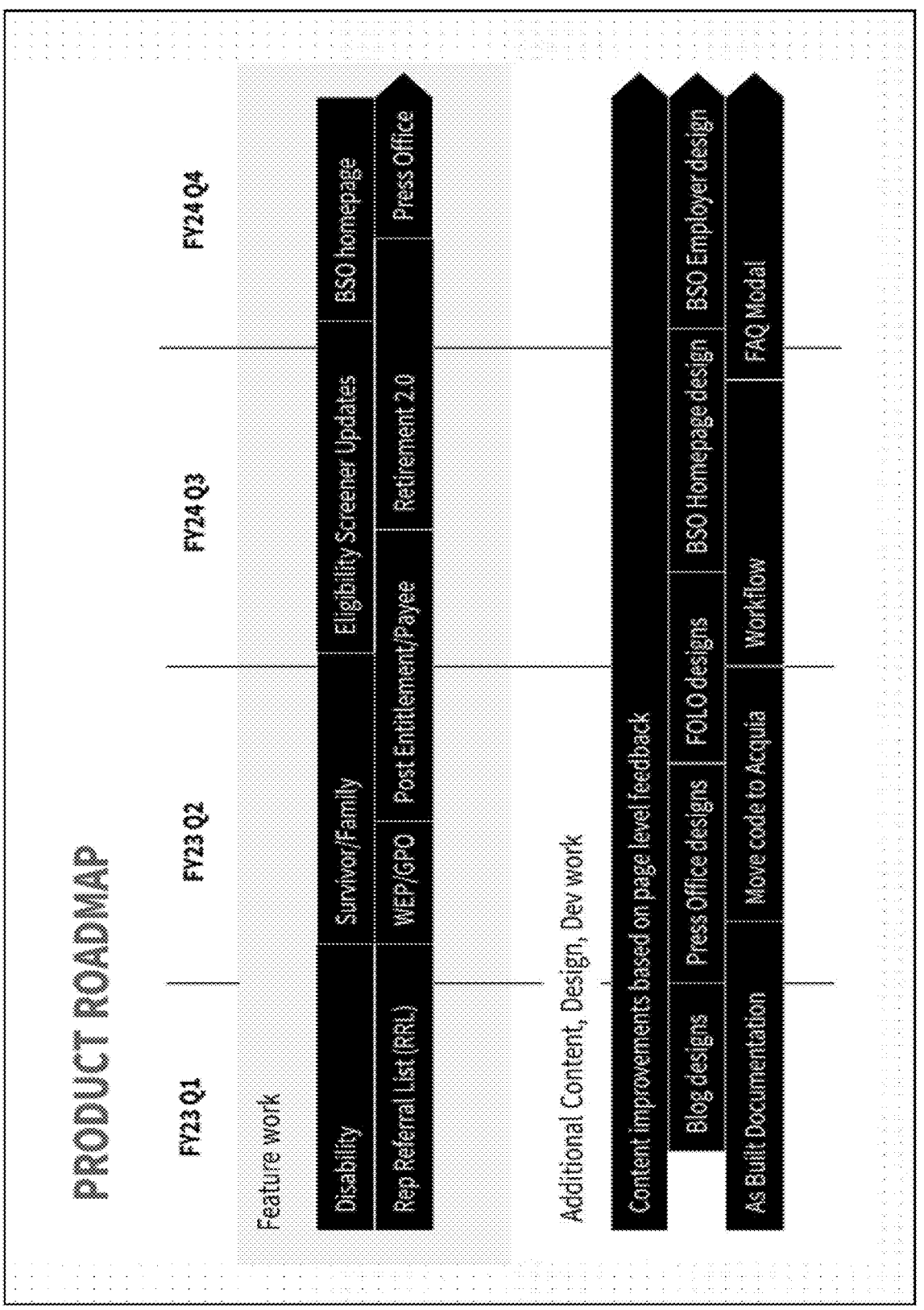
FIG. 4B is a diagram that illustrates an example product roadmap in accordance with one or more embodiments.
Figure 4C:
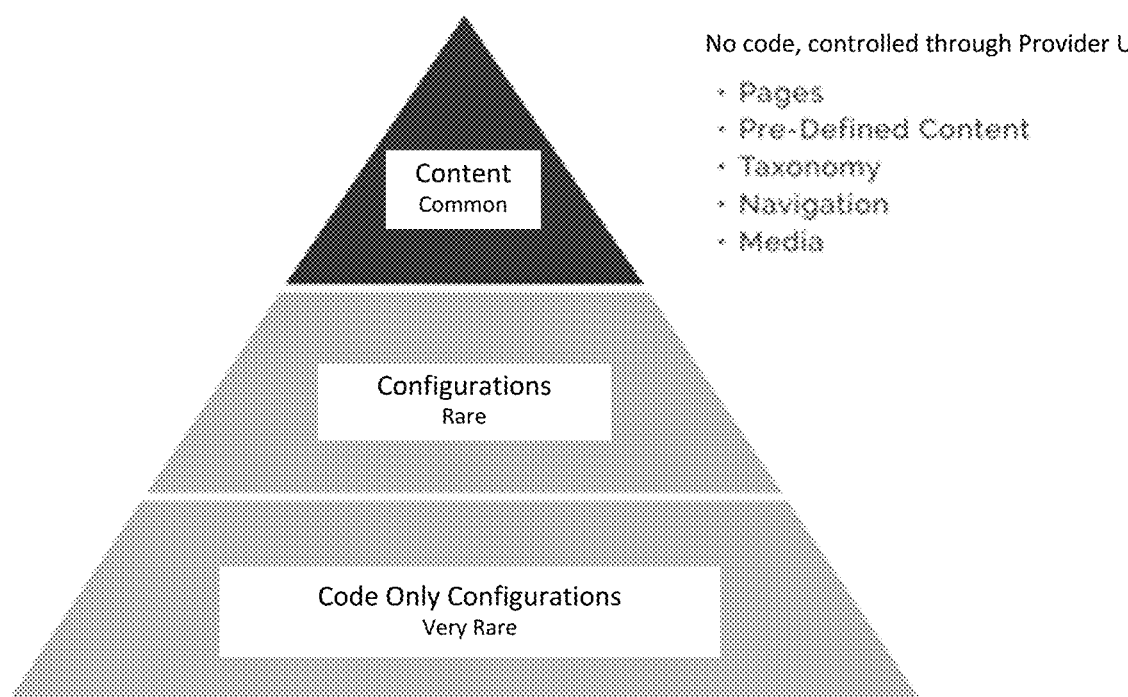
FIG. 4C is a diagram that illustrates an example product and platform strategy in accordance with one or more embodiments.
Figure 4E:
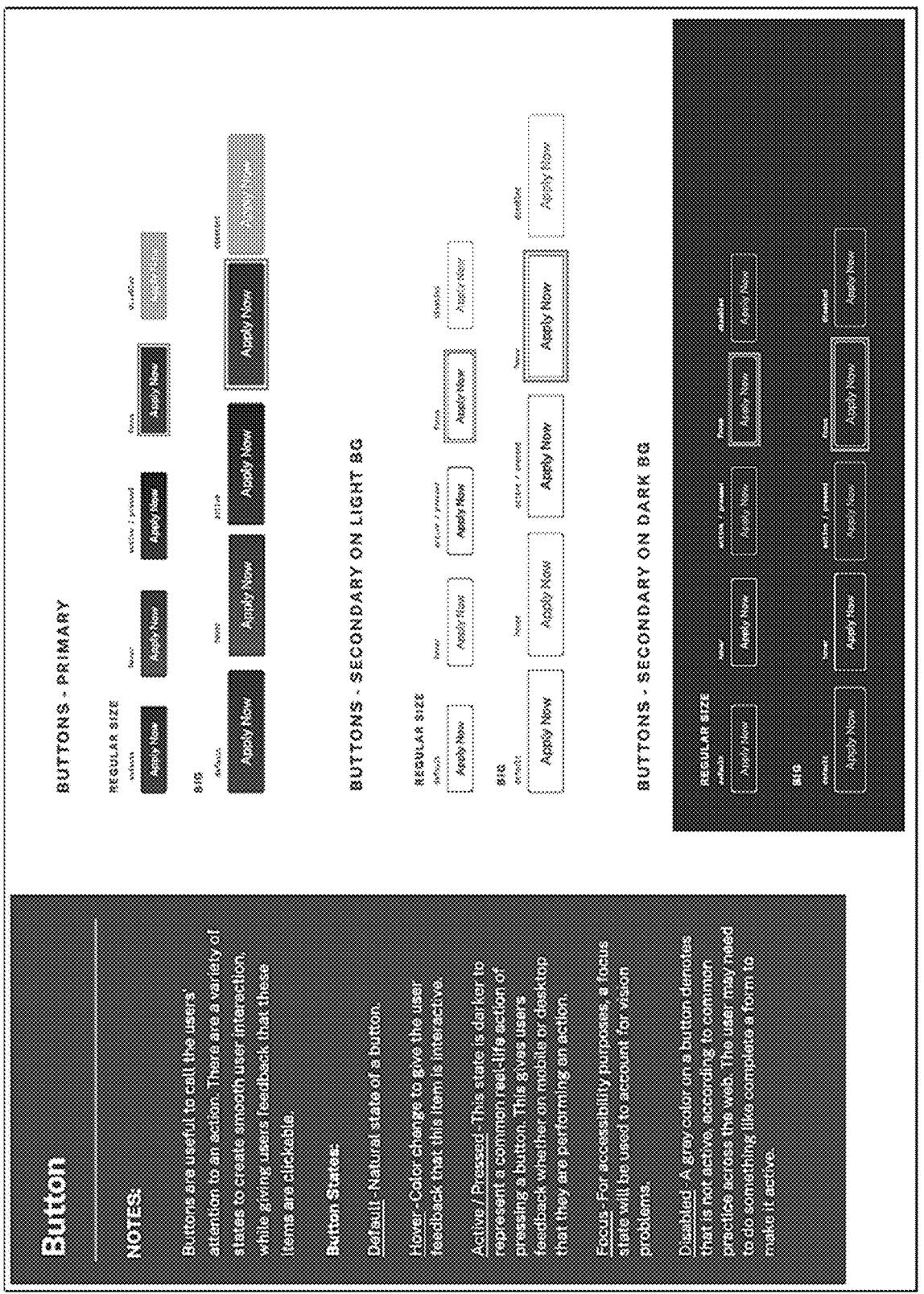
FIG. 4E is a diagram that illustrates an example content governance strategy in accordance with one or more embodiments.

FIG. 4A is a diagram that illustrates example solution evaluation criteria matrix in accordance with one or more embodiments. The solution evaluation criteria matrix may, for example, be an example of criteria used for an identify and assess solution strategy process implemented to evaluate different proposed platform solutions based on, for example, cost, performance, or sustainability, ensuring a fit for the platform's needs. FIG. 4B is a diagram that illustrates an example product roadmap in accordance with one or more embodiments. Such a roadmap may outline development plans of a platform solution. FIG. 4C is a diagram that illustrates an example product and platform strategy in accordance with one or more embodiments. The product and platform strategy may, for example, include a change management plan that outlines specific product development and management strategies, ensuring the platform solution meets user needs and project goals and that the digital platform is scalable, secure, and efficient. FIG. 4D is a diagram that illustrates an example security strategy in accordance with one or more embodiments. A security strategy may, for example, integrate comprehensive security measures into digital solutions, protecting data and maintaining compliance. FIG. 4E is a diagram that illustrates an example content governance strategy in accordance with one or more embodiments. A content governance strategy may, for example, ensure that platform solutions meet regulatory and policy requirements, avoiding legal issues. They may be used to validate that the site complies with regulatory and policy requirements (e.g., in a platform solution validation operation) before launching new pages to an environment. Governance may also establish governance for solution management, ensuring continuous improvement and proper management. FIG. 4F is a diagram that illustrates an example operations and management strategy in accordance with one or more embodiments. An operation and management strategy may define strategies for the operation and management of digital solutions, ensuring efficient post-deployment platform management.

In some embodiments, execution engine 114 is operable to perform an execution operation to deploy a validated platform solution 172. For example, execution engine 114 may perform an execution operation 206 that includes validating recommended platform solution 170 to generate a corresponding validated platform solution 172, and deploying (e.g., in a platform execution environment 100) the validated platform solution 172 as a next/second configuration of content delivery platform 152 that is employed for delivering content to users 104. A validation operation may be generally defined as the process of verifying that a proposed platform solution meets the necessary requirements, standards, and expectations before it is deployed. Such an operation may ensure that a solution is functional, reliable, and ready for implementation in a live environment. Validation typically involves testing, reviewing, and confirming that the solution aligns with the predetermined specifications and objectives established during earlier phases of development. For example, in the context of a website that delivers educational articles and videos, a validation operation may involve testing the recommended platform solution to ensure that it effectively handles user traffic, delivers content without delays, and meets security and compliance standards. This could include load testing to confirm that the website can handle a high number of simultaneous users without performance degradation, as well as verifying that all video content streams smoothly across different devices and browsers. Once a platform solution 170 passes these validation tests, it may be certified as a validated platform solution. Following this, the execution engine 114, for example, could deploy the validated platform solution 172 as the active configuration of the content delivery platform 152, ensuring that users 104 have a seamless experience when accessing educational articles and videos.

In some embodiments, a recommended or validated platform solution 170 includes an executable architecture and security solution, a design solution, a content development solution, a technical development, a document solution, a testing and simulation solution, or a launch solution to deliver content to one or more users 104. An architecture and security solution may be defined as the foundational framework that outlines the structure and security protocols of the platform, ensuring it is built on a robust, scalable architecture while incorporating measures to protect against security threats such as data breaches and unauthorized access. For example, in the context of a website that delivers educational articles, the architecture and security solution may involve designing a scalable cloud-based infrastructure that supports high traffic volumes, coupled with encryption protocols and secure access controls to protect user data and content integrity. A design solution may refer to the visual and user experience (UX) aspects of the platform, focusing on the layout, aesthetics, and navigation flow to ensure that the platform is visually appealing and intuitive for users, thereby enhancing engagement and accessibility. For instance, for an educational website, the design solution may involve creating a clean, responsive layout that adapts to various devices, with easy-to-navigate menus, clear typography, and a visually appealing color scheme that enhances readability and user engagement. A content development solution may be defined as the process and strategy for creating, managing, and delivering high-quality content, ensuring that the content is well-organized, relevant, and aligned with the platform's educational goals. In the case of a website delivering educational articles, the content development solution may involve establishing a content management system (CMS) that allows educators to easily create and update articles, ensuring that the content is accurate, well-researched, and tailored to the needs of different learner groups. Technical development may refer to the coding, programming, and integration work required to build the platform's backend and frontend functionalities, translating the design and content requirements into a functional, interactive website. For example, in the context of an educational website, technical development may include coding the platform to support interactive quizzes, implementing a search function that allows users to easily find articles by topic, and integrating video players for multimedia content. A document solution may be defined as the creation and organization of technical documentation that guides the development, maintenance, and operation of the platform, ensuring that all stakeholders have access to clear, comprehensive documentation that supports the platform's lifecycle. For an educational website, the document solution may include writing detailed user guides for content creators, technical documentation for developers, and maintenance manuals that outline procedures for updating the platform and troubleshooting issues. A testing and simulation solution may refer to the processes used to rigorously test the platform before it goes live, involving simulating real-world usage scenarios to identify and resolve bugs, performance issues, and security vulnerabilities. For instance, in the context of an educational website, the testing and simulation solution may involve running load tests to ensure the platform can handle thousands of simultaneous users, conducting usability testing with target audience groups, and performing security penetration tests to identify potential vulnerabilities. A launch solution may be defined as the strategy and actions taken to deploy the platform to a live environment, ensuring that the platform is introduced to users smoothly, with minimal disruption and maximum impact. For an educational website, the launch solution may include a phased rollout where the platform is gradually introduced to users, accompanied by a marketing campaign to announce the launch, and support channels are set up to assist users with any issues they encounter during the initial launch period.

In some embodiments, deploying a validated platform solution to deliver content to one or more users includes executing a corresponding architecture and security solution, design solution, content development solution, technical development, document solution, testing or simulation solution, or launch solution to deliver content to one or more users. An execution operation may be defined as the series of actions or processes carried out to implement a validated platform solution into a live environment. This operation involves deploying the platform solution, configuring it according to the established requirements, and ensuring that it operates effectively within the intended environment. The execution operation may also include monitoring the platform post-deployment to confirm that it meets performance, security, and usability standards, as well as making any necessary adjustments or optimizations. For example, in the context of a website that delivers educational articles, an execution operation may involve deploying the validated platform solution to a cloud hosting environment. This might include setting up the server infrastructure, configuring the content management system (CMS), and ensuring that all security measures—such as SSL certificates and firewalls—are active. The operation could also involve importing the initial batch of educational articles into the CMS, setting up user accounts for content creators, and configuring the platform's analytics tools to track user engagement. After deployment, the execution operation may include a period of monitoring to ensure the website is performing as expected, with adjustments made as necessary to optimize load times, fix any bugs, or enhance the user experience.

The execution phase encompasses the implementation of all necessary aspects of the platform solution, ensuring alignment with established objectives, requirements, and strategies. This phase oversees the product implementation process, including product management, design, development, configuration and change control, security compliance, and ongoing monitoring. Execution may involve deploying product development strategies that implement objectives and guide architecture modifications, solution development, and project management, using pre-approved plans as roadmaps. Stakeholders may be engaged at key intervals to assess deliverables and are regularly consulted on priorities, features, and approvals. Agile methodologies may be employed to enable faster delivery and maintain mission relevance through continuous integration and deployment. Industry best practices, combined with lessons learned, may be utilized to reduce delivery times, enhance product quality, and ensure adherence to policies and regulatory standards.

In some embodiments, an iteration engine 116 is operable to perform an iteration operation to determine an updated platform solution 174. For example, iteration engine 116 may perform an iteration operation 208 that includes monitoring execution of a current (e.g., the next/second) configuration of content delivery platform 152 (e.g., corresponding to validated platform solution 172) deployed and executed in platform execution environment 100, and determining (e.g., based on the monitoring of operation of the current configuration of the content delivery platform 152, an updated platform solution 174. An iteration operation may be defined as a continuous process of evaluating and refining a platform solution to improve its performance, functionality, or alignment with evolving objectives. This operation involves monitoring the execution of the current platform configuration, gathering data on its performance, user feedback, operational metrics, and response data from interactive elements like surveys or prompts. The iteration operation uses this information to identify areas for improvement, leading to the development of an updated platform solution that addresses identified issues, incorporates new features, or optimizes existing functionalities. For example, in the context of a website that delivers educational articles, an iteration operation may involve monitoring the website's performance after a new platform update has been deployed. The iteration engine might track user engagement metrics, such as how often articles are read, how long users stay on the site, and which articles are most popular. Additionally, it could analyze responses to interactive prompts or surveys embedded within the site, collecting user feedback on the quality of the content, ease of navigation, and overall satisfaction. Technical performance would also be monitored, including load times, server response rates, and any errors or downtime. Based on this monitoring and analysis, the iteration engine may determine that certain features need improvement-such as enhancing the search functionality to help users find articles more easily or optimizing the website's mobile interface for better accessibility. It might also identify a need to adjust content strategy based on user feedback, such as adding more in-depth articles on popular topics. The result of this iteration operation would be an updated platform solution that better meets user needs, improves overall site performance, and increases user satisfaction, which would then be deployed in a subsequent iteration.

In such an embodiment, updated platform solution 174 is deployed in platform execution environment 100 as a third configuration of content delivery platform 152 (e.g., after the first/initial configuration and the next/second configuration). In some embodiments, updated platform solution 174 is validated to generate an updated validated solution 172, and the updated validated solution 172 is deployed in platform execution environment 100 to effectuate the "third" configuration of content delivery platform 152. As described here, an iteration operation may be defined as a cyclical process of refining and improving a platform solution by incorporating feedback and performance data from previous deployments. This operation can involve monitoring the current platform configuration, identifying areas for improvement, and developing an updated platform solution that addresses those areas. The process can also include validating the updated solution to ensure it meets the necessary requirements and standards before deploying it as a new configuration in the platform execution environment. For example, in the context of a website that delivers educational articles, an iteration operation might begin with monitoring the performance of the current version of the website, focusing on factors like user engagement, content accessibility, and technical stability. Based on this analysis, an updated platform solution could be developed to address identified issues-such as improving page load times, enhancing the search functionality, or updating the site's design for better mobile compatibility. Once the updated platform solution is developed, it undergoes a validation process to ensure it meets all the specified criteria, including security, performance, and user experience standards. This validation might involve testing the updated version in a staging environment to simulate real-world usage and identify any potential issues before deployment. After successfully passing the validation process, the updated validated solution is then deployed as the "third" configuration of the website in the platform execution environment. In this example, the updated validated solution for the educational website might include, for example, a redesigned interface that makes it easier for users to find and read articles, faster load times, and improved mobile functionality. The deployment of this third configuration may replace the previous version, offering users an enhanced experience based on the insights gained from the iteration operation.

During the iteration operation, a product iteration strategy may be employed to ensure continuous integration and deployment based on end-user feedback, customer and stakeholder goals, policy updates, content development needs, and ongoing maintenance improvements. This approach may allow the platform to adapt to organizational changes, advancing technologies, governance modifications, and critical security updates. The iteration phase may include implementing an Agile framework to accelerate the release of new features and products while maintaining proper documentation and configuration management. A consistent cadence may be established for reviewing performance, analytics, and feedback. Metrics may be designed to assess platform optimizations and guide prioritization. Product performance may be verified to meet required thresholds, and the backlog may be reprioritized for the next development cycle. Clear roadmaps and work plans may be maintained to ensure a carefully structured sequence of new or improved feature deployments.

Figure 5A:
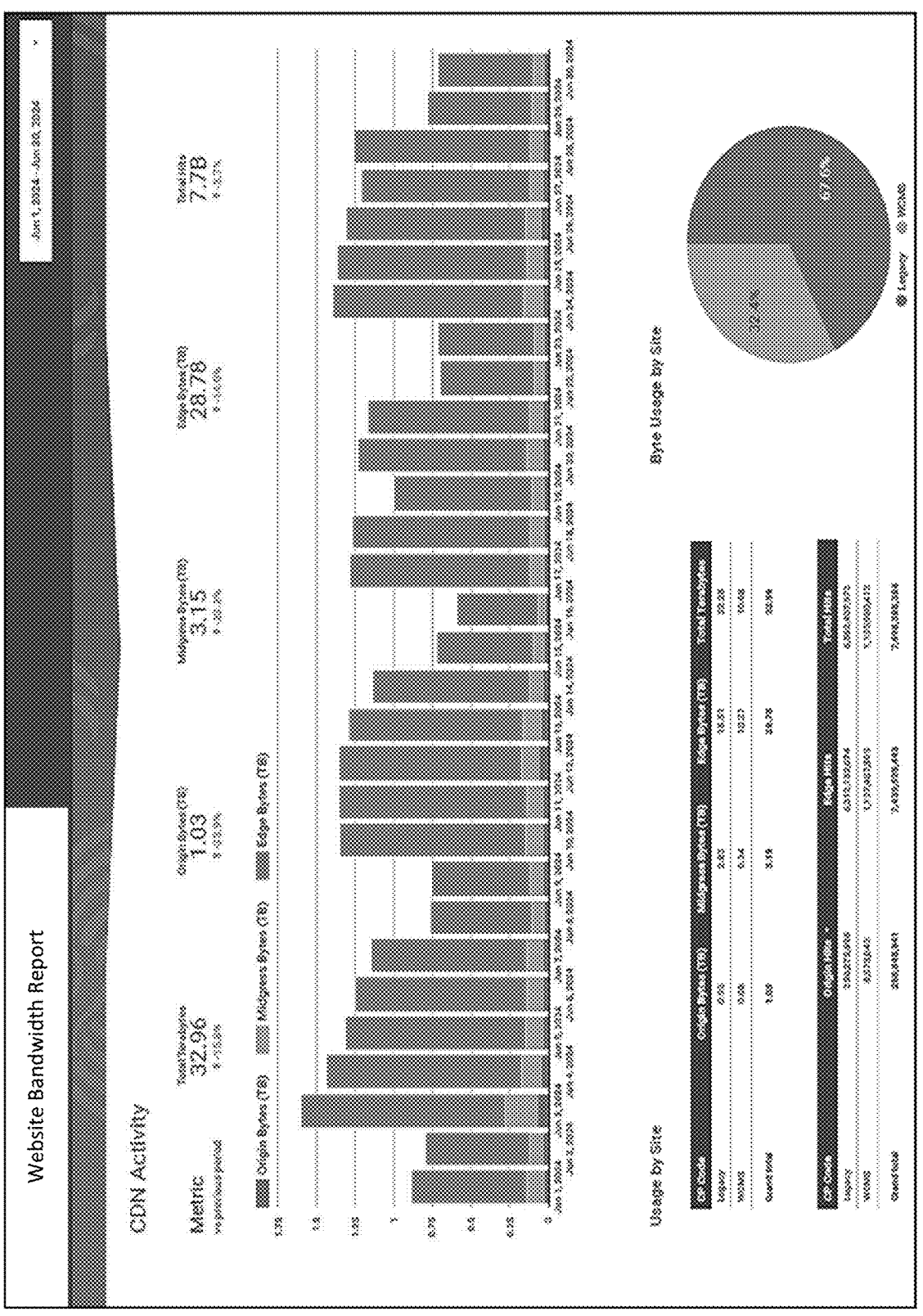
FIG. 5A is a diagram that illustrates an example deployment monitoring operation page in accordance with one or more embodiments.
Figure 5C:
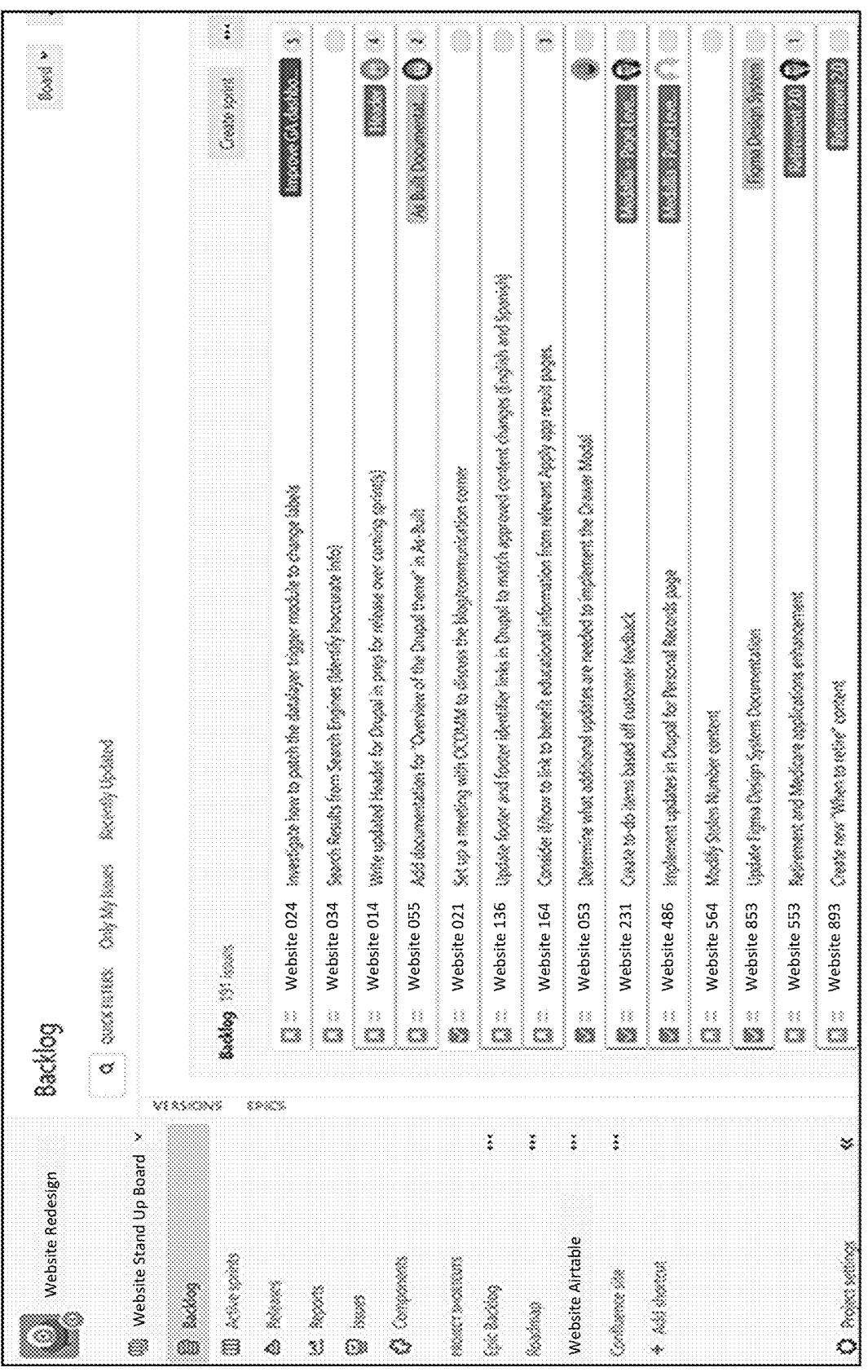
FIG. 5C is a diagram that illustrates an example backlog of solution updates in accordance with one or more embodiments.
Figure 5D:
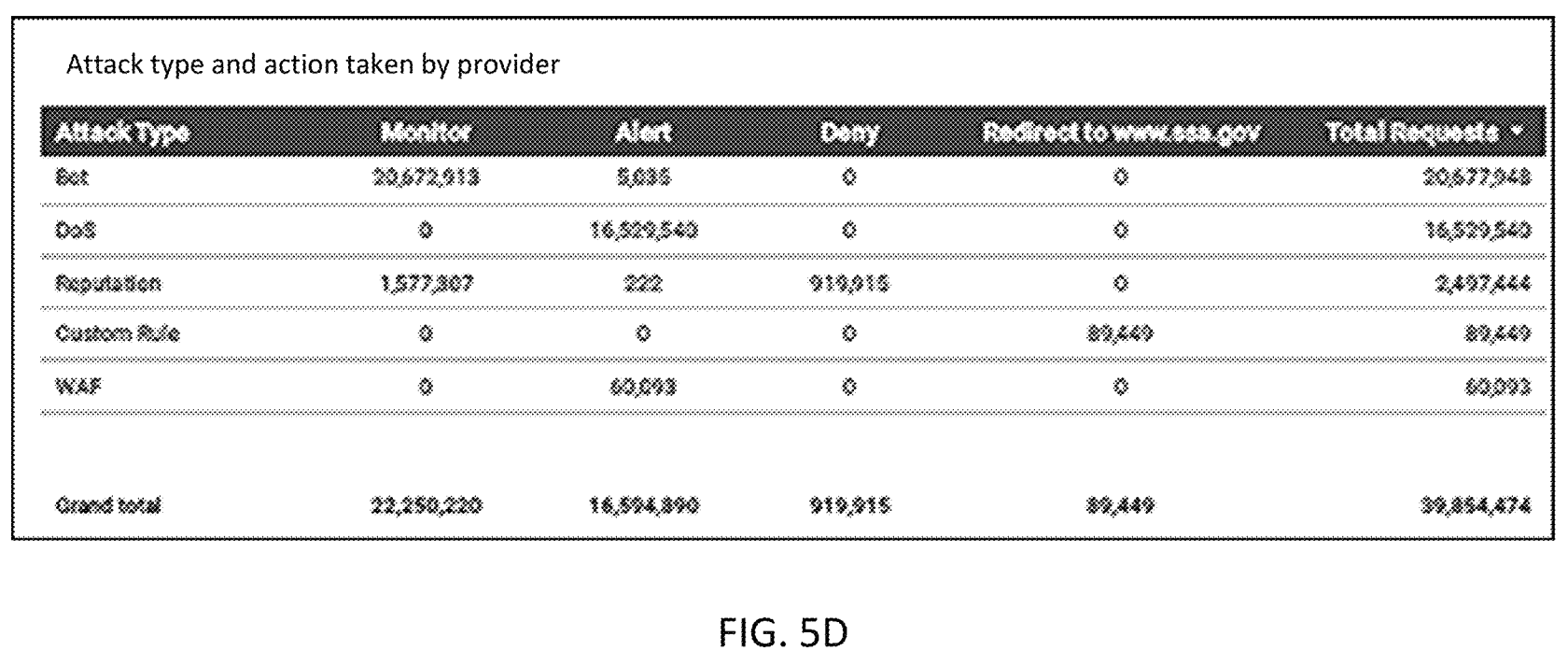

FIG. 5A is a diagram that illustrates an example deployment monitoring operation page in accordance with one or more embodiments. Monitoring of a deployed solution may include monitoring whether the deployed platform functions as intended and identifying areas for improvement/modification. FIG. 5B is a diagram that illustrates an example user feedback/improvement synthesis in accordance with one or more embodiments. Such a synthesis may be generated by a human developer (or a development system) (e.g., by way of application of generative artificial intelligence (AI) to obtained response data 154, including comments provided by users 104). FIG. 5C is a diagram that illustrates an example backlog of solution updates (e.g., of a continuous integration/deployment (or "CI/CD")) in accordance with one or more embodiments. Such a CI/CD may involve a proscribed cadence for continuous integration and continuous deployment updating the platform solutions based on feedback and performance data, keeping them relevant and effective. FIG. 5D is a diagram that illustrates an example security management in accordance with one or more embodiments. 10.27. Security management may ensure security measures continuously protect against new threats and maintain compliance.

Figure 6:
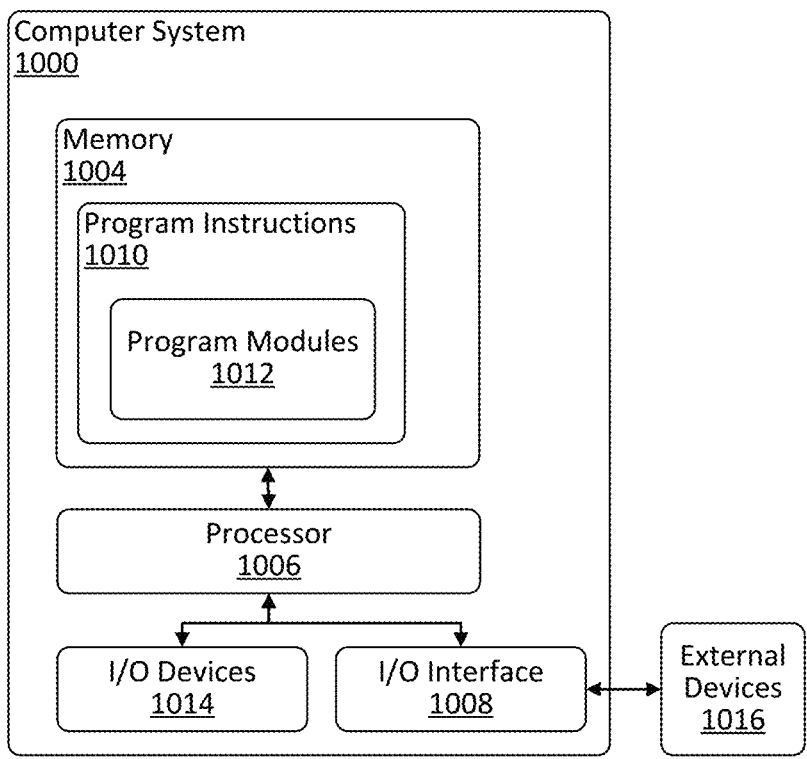
FIG. 6 is a diagram that illustrates an example computer system in accordance with one or more embodiments.

FIG. 6 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), program-mable read-only memory (PROM), erasable programmable read-only memory (EPROM), electrically erasable program-mable read-only memory (EEPROM)), volatile memory (e.g., random access memory (RAM), static random-access memory (SRAM), synchronous dynamic RAM (SDRAM)), or bulk storage memory (e.g., CD-ROM or DVD-ROM, hard drives). The memory 1004 may include a non-transi-tory computer-readable storage medium having program instructions 1010 stored on the medium. The program instructions 1010 may include program modules 1012 that are executable by a computer processor (e.g., the processor 1006) to cause the functional operations described, such as those described with regard to one or more of the entities described (e.g., system 102, users 104, platform engine 106, discovery engine 110, strategy engine 112, execution engine 114, or iteration engine 116), or one or more of the opera-tions described (e.g., one or more method operations of method 200).

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different process-ing cores to generate a simulation of a reservoir. The I/O interface 1008 may provide an interface for communication with one or more I/O devices 1014, such as a joystick, a computer mouse, a keyboard, or a display/touch screen (e.g., an electronic display for displaying a graphical user inter-face (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, computer systems, servers or electronic communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be under-stood that the forms of the embodiments shown and described here are to be taken as examples of embodiments. Elements and materials may be substituted for those illus-trated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combi-nation of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). As used throughout this application, the term "to" does not limit the associated operation to being directly to. Thus, for example, transmitting an item "to" an entity may include transmitting an item directly to the entity or indirectly to the entity (e.g., by way of an intermediary entity). Unless specifically stated otherwise, as apparent from the discussion, it is appreciated that throughout this specification discussions utilizing terms such as "processing," "computing," "calculating," "deter-mining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A platform generation and management system comprising:

a computer processor; and a platform engine comprising program instructions stored on non-transitory computer-readable storage medium that are executable by the computer processor to deploy a content delivery platform, the platform engine comprising:

a discovery engine comprising program instructions stored on the non-transitory computer-readable storage medium that are executable by the computer processor to perform a discovery operation to determine platform solution components, the discovery operation comprising:

obtaining platform operational data, the platform operational data comprising:

platform configuration data indicative of a first configuration of the content delivery platform;

platform performance data indicative of performance of the first configuration of the content delivery platform; and platform response data indicative of user interaction with the first configuration of the content delivery platform;

determining, based on the platform operational data, operational conditions associated with the first configuration of the content delivery platform; and determining, based on the operational conditions associated with the first configuration of the content delivery platform, the platform solution components;

a strategy engine comprising program instructions stored on the non-transitory computer-readable storage medium that are executable by the computer processor to perform a strategy operation to determine a platform solution, the strategy operation comprising:

determining, based on the platform solution components, one or more potential platform solutions; and determining, based on the one or more potential platform solutions, a platform solution;

an execution engine comprising program instructions stored on the non-transitory computer-readable storage medium that are executable by the computer processor to perform an execution operation, the execution operation comprising:

validating the platform solution determined to generate a validated platform solution; and deploying, in a platform execution environment, the validated platform solution as a second configuration of the content delivery platform to deliver content to one or more users; and an iteration engine comprising program instructions stored on the non-transitory computer-readable storage medium that are executable by the computer processor to perform an iteration operation to determine an updated platform solution, the iteration operation comprising:

monitoring execution of the second configuration of the content delivery platform corresponding to the validated platform solution in the platform execution environment; and determining, based on the monitoring of the operation of the second configuration of the content delivery platform, an updated platform solution.

2. The system of claim 1, wherein the updated platform solution is deployed on a network to implement an updated version of the content delivery platform.

3. The system of claim 1, wherein operational conditions are indicative of operational performance or user performance.

4. The system of claim 1, wherein the solution components comprise solution requirement or solution factors for generating platform modifications.

5. The system of claim 1, wherein each potential platform solution of the potential platform solutions comprises a platform solution strategy, a platform solution rating, or a platform solution factor.

6. The system of claim 1, wherein determining a platform solution comprises determining solution scores for the one or more potential platform solutions and selecting the platform solution based on the solution scores.

7. The system of claim 1, wherein deploying the validated platform solution to deliver content to one or more users comprises executing architecture and security solution, a design solution, a content development solution, a technical development, a document solution, a testing and simulation solution, or a launch solution to deliver content to one or more users.

8. The system of claim 1, wherein the updated platform solution is validated to generate an updated validated solution, and wherein the updated validated solution is deployed in the platform execution environment as a third configuration of the content delivery platform to deliver content to one or more users.

9. The system of claim 1, wherein the content delivery platform comprises an Internet website.

10. A platform generation and management method comprising:

conducting, by a platform engine comprising program instructions stored on non-transitory computer-readable storage medium that are executable by a computer processor to deploy a content delivery platform, a discovery operation to determine platform solution components, the discovery operation comprising:

obtaining, by the platform engine, platform operational data, the platform operational data comprising:

platform configuration data indicative of a first configuration of a content delivery platform;

platform performance data indicative of performance of the first configuration of the content delivery platform; and platform response data indicative of user interaction with the first configuration of the content delivery platform;

determining, based on the platform operational data, operational conditions associated with a first configuration of the content delivery platform; and determining, based on the operational conditions associated with the first configuration of the content delivery platform, the platform solution components;

conducting, by the platform engine, a strategy operation to determine a platform solution, the strategy operation comprising:

determining, based on the platform solution compo-nents, one or more potential platform solutions; and determining, based on the one or more potential plat-form solutions, a platform solution;

conducting, by the platform engine, an execution opera-tion, the execution operation comprising:

validating the platform solution determined to generate a validated platform solution; and deploying, in a platform execution environment, the validated platform solution as a second configuration of the content delivery platform to deliver content to one or more users; and conducting, by the platform engine, an iteration operation to determine an updated platform solution, the iteration operation comprising:

monitoring execution of the second configuration of the content delivery platform corresponding to the vali-dated platform solution in the platform execution environment; and determining, based on the monitoring of the operation of the second configuration of the content delivery platform, an updated platform solution.

11. The method of claim 10, wherein the updated platform solution is deployed on a network to implement an updated version of the content delivery platform.

12. The method of claim 10, wherein operational condi-tions are indicative of operational performance or user performance.

13. The method of claim 10, wherein the solution com-ponents comprise solution requirement or solution factors for generating platform modifications.

14. The method of claim 10, wherein each potential platform solution of the potential platform solutions com-prises a platform solution strategy, a platform solution rating or a platform solution factor.

15. The method of claim 10, wherein determining a platform solution comprises determining solution scores for the one or more potential platform solutions and selecting the platform solution based on the solution scores.

16. The method of claim 10, wherein deploying the validated platform solution to deliver content to one or more users comprises executing architecture and security solution, a design solution, a content development solution, a tech-nical development, a document solution, a testing and simu-lation solution, or a launch solution to deliver content to one or more users.

17. The method of claim 10, wherein the updated platform solution is validated to generate an updated validated solu-tion, and wherein the updated validated solution is deployed in the platform execution environment as a third configura-tion of the content delivery platform to deliver content to one or more users.

18. The method of claim 10, wherein the content delivery platform comprises an Internet website.

19. A non-transitory computer-readable storage medium comprising program instructions stored thereon that are executable by a processor to cause operations for platform generation and management, the operations comprising:

conducting a discovery operation to determine platform solution components, the discovery operation compris-ing:

obtaining, by a platform engine, platform operational data, the platform operational data comprising:

platform configuration data indicative of a first con-figuration of a content delivery platform;

platform performance data indicative of performance of the first configuration of the content delivery platform; and platform response data indicative of user interaction with the first configuration of the content delivery platform;

determining, based on the platform operational data, operational conditions associated with a first con-figuration of the content delivery platform; and determining, based on the operational conditions asso-ciated with the first configuration of the content delivery platform, the platform solution components;

conducting a strategy operation to determine a platform solution, the strategy operation comprising:

determining, based on the platform solution compo-nents, one or more potential platform solutions; and determining, based on the one or more potential plat-form solutions, a platform solution;

conducting an execution operation, the execution opera-tion comprising:

validating the platform solution determined to generate a validated platform solution; and deploying, in a platform execution environment, the validated platform solution as a second configuration of the content delivery platform to deliver content to one or more users; and conducting an iteration operation to determine an updated platform solution, the iteration operation comprising:

monitoring execution of the second configuration of the content delivery platform corresponding to the vali-dated platform solution in the platform execution environment; and determining, based on the monitoring of the operation of the second configuration of the content delivery platform, an updated platform solution.

* * * * *